(12) United States Patent
van Ooij et al.

(10) Patent No.: US 7,732,016 B2
(45) Date of Patent: Jun. 8, 2010

(54) SUPERPRIMER

(75) Inventors: Wim J. van Ooij, Fairfield, OH (US); Anuj Seth, Cincinnati, OH (US); Matthew B Stacy, Cincinnati, OH (US)

(73) Assignee: The University of Cincinnati, Cincinnati, OH (US)

( * ) Notice: Subject to any disclaimer, the term of this patent is extended or adjusted under 35 U.S.C. 154(b) by 0 days.

(21) Appl. No.: 12/316,680

(22) Filed: Dec. 17, 2008

(65) Prior Publication Data

US 2009/0155473 A1 Jun. 18, 2009

Related U.S. Application Data

(60) Division of application No. 11/041,352, filed on Jan. 24, 2005, now Pat. No. 7,482,421, which is a continuation of application No. PCT/US03/23055, filed on Jul. 24, 2003.

(60) Provisional application No. 60/398,247, filed on Jul. 24, 2002.

(51) Int. Cl.
*B05D 3/02* (2006.01)

(52) U.S. Cl. .................................... 427/387

(58) Field of Classification Search ........................ None
See application file for complete search history.

(56) References Cited

U.S. PATENT DOCUMENTS

| | | | |
|---|---|---|---|
| 4,330,446 A | 5/1982 | Miyosawa | |
| 5,244,959 A | 9/1993 | Hazan et al. | |
| 5,252,660 A | 10/1993 | Hazan et al. | |
| 6,071,566 A | 6/2000 | Brown et al. | |
| 6,251,973 B1 | 6/2001 | Robinson et al. | |
| 6,361,592 B1 | 3/2002 | Song et al. | |

(Continued)

FOREIGN PATENT DOCUMENTS

DE      199 47 233 A1      11/2001

(Continued)

OTHER PUBLICATIONS

Van Ooij, Wim J., Novel Environmentally Compliant Self-Priming Coating Systems for Corrosion Protection of Metals, Polymer Preprints, 2004, pp. 153-154, vol. 45 (2), University of Cincinnati, Cincinnati, OH, USA.

(Continued)

*Primary Examiner*—Erma Cameron
(74) *Attorney, Agent, or Firm*—Taft Stettinius & Hollister LLP

(57) ABSTRACT

A silane film that can be used in a wide range of environments, on metals of engineering interest, as a standalone process or as a primer for a top-coating by common paint systems. The film generally comprises: a) at least one bis-silane; b) a water soluble or dispersible polymer; c) nanoparticles; and, d) a water soluble solvent. It is also within the scope of the present invention to include a leachable inhibitor into the silane film. In sum, the present invention teaches a silane composition that may be applied by dipping, wiping, spraying, brushing, or other conventional techniques, whereby the film composition provides a metal treatment that is water soluble and may provide the availability of the coating to "heal" by utilizing a leachable inhibitor whenever damage occurs from scrapes or scratches.

12 Claims, 38 Drawing Sheets

U.S. PATENT DOCUMENTS

| | | |
|---|---|---|
| 6,375,789 B1 | 4/2002 | Katz et al. |
| 6,416,817 B1 * | 7/2002 | Rangwalla et al. .......... 427/377 |
| 6,416,869 B1 * | 7/2002 | van Ooij et al. ............. 428/450 |
| 6,596,835 B1 | 7/2003 | Brown et al. |
| 2009/0155473 A1 | 6/2009 | van Ooij et al. |

FOREIGN PATENT DOCUMENTS

| | | |
|---|---|---|
| DE | 101 46 446 A1 | 2/2003 |
| EP | 0 551 102 B1 | 3/1996 |
| EP | 1 130 131 A2 | 9/2001 |
| EP | 1130131 * | 9/2001 |
| WO | WO 99/14277 | 3/1999 |
| WO | WO 00/46310 | 8/2000 |
| WO | WO 00/46311 | 8/2000 |
| WO | WO 00/46312 | 8/2000 |
| WO | WO 00/63303 | 10/2000 |
| WO | WO 01/20058 A1 | 3/2001 |
| WO | WO 01/64356 A1 | 9/2001 |
| WO | WO 02/24322 A2 | 3/2002 |
| WO | WO 02/31063 A1 | 4/2002 |
| WO | WO 02/31064 A1 | 4/2002 |
| WO | PCT/US03/23055 | 11/2003 |
| WO | WO 2004/009717 A1 | 1/2004 |
| WO | WO 2004/076568 A1 | 9/2004 |
| WO | WO 2004/076717 A1 | 9/2004 |
| WO | WO 2004/076718 A1 | 9/2004 |

OTHER PUBLICATIONS

Van Ooij, Wim J., Replacement of Chromates by Silanes—An Overview, Presented at ICEPAM, Jun. 15-18, 2004, pp. 1-12, Oslo, Norway.

Van Ooij, et al., A Novel Self-Priming Coating for Corrosion Protection, 3rd Int'l Surface Engineering Congress, Aug. 2-4, 2004, pp. 8-13, Orlando, FL, USA.

Guirong, et al., Neutron reflectivity investigation of bis-amino silane films, J. Adhesion Sci. Technol., 2003, pp. 2175-2189, vol. 17, No. 16, VSP.

Seth, et al., Novel, Water-Based High-Performance Primers That Can Replace Metal Pretreatments and Chromate-Containing Primers, Journal of Materials Engineering and Performance, Aug. 2004, pp. 468-474, vol. 13 (4), ASM International.

Van Ooij, et al., Novel Environmentally Compliant Self-Priming Coating Systems for Corrosion Protection of Metals, Presentation by Authors, Aug. 26, 2004, pp. 1-36, University of Cincinnati, Cincinnati, OH, USA.

Van Ooij, et al., A Novel Self-Priming Coating System for Corrosion Protection, Presentation by Authors, Aug. 4, 2004, pp. 1-27, University of Cincinnati, Cincinnati, Ohio, USA.

Van Ooij, et al., Novel Environmentally Compliant Self-Priming Coating Systems for Corrosion Protection of Metals. Presentation by Authors, Aug. 23, 2004, pp. 1-49, University of Cincinnati, Cincinnati, Ohio, USA.

Van Ooij, Wim J., Replacement of Chromates by Silanes an Overview, Presentation by Authors, Jun. 16, 2004, pp. 1-67, University of Cincinnati, Cincinnati, Ohio, USA.

* cited by examiner

| Overview of Silane Effectiveness | | |
|---|---|---|
| Metal | Forms of Corrosion Controlled | Bonding/Adhesion |
| Cold-rolled Steel | Uniform, Scribe Creep, Blistering | Powder Paints, E-Coats, Appliance Paints, Rubber |
| Hot-rolled Steel | Scribe Creep | Waterborne Paints |
| Electrogalvanized Steel | Scribe Creep | E-Coats, Powder Paints, Rubber |
| Hot-Dip Galvanized Steel | White Rusting | Powder Paints, E-Coats |
| Titanium Zinc Sheets | White Rusting | --- |
| Galvalume® Sheet | Edge Creep, Scribe Creep, White Rust | Powder Paints, Coil Paint Systems |
| Galvannealed Sheet | Scribe Creep | E-Coats |
| Aluminum Alloys 1XXX, 2XXX, 3XXX, 5XXX, 6XXX, 7XXX | Uniform, Pitting, SCC, Filiform, Possibly CFC | Powder Paints, Rubber |
| Copper, Brass | Uniform, SCC, Dealloying | --- |
| Nickel | Galvanic | --- |
| Magnesium Alloys | Pitting, Uniform, Galvanic (steel) | |

Fig. 3

Coating Compositions

| Type | Resin | Silane | Particle | Comments |
|---|---|---|---|---|
| A | 5 | 1 | 4 | "Silane Light" formulation, too much filler, voids |
| B | 4 | 5 | 1 | "Silica Light" formulation, good film formation |
| D | 3 | 5 | 2 | "Polymer Light" formulation, Not Yet Done |
| F | 5 | 4 | 1 | Film formation |
| G | 6 | 3 | 1 | Film formation |
| H | 5 | 3 | 2 | Film formation |

Fig. 6

100 ml solution

| Coating Type | Resin | Silane | Particle | Comments |
|---|---|---|---|---|
| B5-6 | 4 | 5 | 1 | B5 has been formulated with K-3 and A1170/VTAS<br><br>B6 formulated with Maincote PR-71 and<br><br>Y15445/VTAS |
| G4 | 6 | 3 | 1 | Formulated with Maincote PR-71 and<br><br>Y15445/UPS/VTAS |
| H6 | 5 | 3 | 2 | Formulated with Maintcote PR-71 and<br><br>Y15445/UPS/VTAS |

Fig. 7

SUPERPRIMER

CROSS REFERENCE TO RELATED APPLICATIONS

This application is a divisional of prior application Ser. No. 11/041,352, filed Jan. 24, 2005 now U.S. Pat. No. 7,482,421, which is a continuation that claims priority under 35 U.S.C. §120 of Patent Cooperation Treaty Application Serial No. PCT/US2003/023055 filed on Jul. 24, 2003, entitled "SUPERPRIMER" which claimed priority to U.S. Provisional Patent Application Ser. No. 60/398,247, entitled "SUPERPRIMER", filed on Jul. 24, 2002, the disclosures of which are incorporated herein by reference.

BACKGROUND

1. Field of the Invention

The present inventions relates to corrosion protection and increased adhesion between substrates and a subsequent bonded material. More specifically, the present invention is related to primers, manufactured from at least one organofunctional bis-silane, having increased film thickness, chemical and scratch resistance, as well as being substantially chromate-free and comprising little to no VOCs.

2. Background of the Invention

In recent years, organofunctional silanes have been shown to be powerful systems for protecting a wide range of metals against corrosion when applied as primers. The adhesion of paint is drastically improved when organofunctional silanes are applied as a primer pretreatment. Adhesion and adhesion durability of metals to rubber compounds and structural adhesives have also been objectives of prior art organofunctional silanes systems.

When used as a corrosion protection treatment without paint, prior art silane films have limitations in that the film thickness is not more than 0.3 µm. Such films provide remarkable protection so long as they are not scratched or otherwise damaged. Also, it has been very difficult to apply a thin silane film without pinholes or other defects appearing in the film. In addition, prior art silane films have been transparent and colorless, thereby providing little visual detection as to defects in the film. Consequently, prior art silane films applied alone provided only temporary protection of metals and, therefore, there is a need for metal treatment systems that meet or exceed the following criteria* which prior art silane films cannot meet entirely:

1. the film thickness should range from 1 to 20 µm;
2. the coating should cure in air or thermally at slightly elevated temperatures;
3. the coating should withstand deep drawing;
4. the coating should adhere very well to metals and should be paintable by all common paint systems such as epoxies, polyesters, acrylates, polyurethanes and the like;
5. the coating should have a high UV resistance so that it can be used externally without overcoating;
6. the compounds used in the coating should all be water soluble or dispersible; it should be a low VOC system (Volatile Organic Compound);
7. the coating should be applied by dipping, wiping, spraying, brushing, and other well known applications methods;
8. the coating should not be completely transparent but opaque and have a color, so that the metal can still be observed but the film can be detected visually; and
9. the coating should have a high thermal stability (it should be stable to at least 250° C. for one hour).

It is to be understood that the above "criteria" do not constitute limitations upon the scope of the present invention. One of ordinary skill will surely understand that a silane compound may come within the scope of the present invention even though it fails to meet one or more of the above "criteria".

SUMMARY OF THE INVENTION

The present invention provides a superprimer that can be used in a wide range of environments, on all metals of engineering interest, as a standalone process or as a primer for a paint application process. The superprimer generally comprises: a) at least one organofunctional silane; b) a low-molecular weight water soluble or dispersible polymer or copolymer; c) a pigment; d) a water soluble inhibitor; and e) additional components such as emulsifiers, surfactants, film builders, UV absorbers or reflectors, thickeners, or toughening agents such as end-functionalized silicones. In addition, it is a first aspect of the present disclosure to provide a method of laminating a substrate with a corrosive barrier comprising the steps of: (a) mixing a bis-silane, a water soluble or dispersible polymer, nanoparticles having mean particle size of between about 0.01 nanometers and about 500 nanometers, and a water soluble solvent to comprise a resultant mixture; (b) applying the resultant mixture to a substrate; and (c) curing the resultant mixture on the substrate to create a corrosive barrier having a thickness greater than 20 microns. In a more detailed embodiment of the first aspect, the mixing step includes the step of including at least one of an emulsifier, a surfactant, a film builder, a leachable inhibitor, a thickener, a toughening agent, an ultraviolet absorber, and an ultraviolet reflector to the mixture. In yet another more detailed embodiment, the leachable inhibitor includes at least one of a salt of trivalent cerium (Ce), a salt of trivalent lanthanum (Le), a salt of yttrium (Y), a molybdate, a phosphate, a phosphonate, a phosphomolybdate, a vanadate, a borate, an amine, a glycolate, a sulfenamide, and a tungstate. In a further detailed embodiment, the bis-silane comprises between about 10 percent to about 40 percent of the composition, the nanoparticles comprise between about 5 percent to about 25 percent of the composition, the water soluble or dispersible polymer comprises between 10 percent to about 30 percent of the composition, and the water soluble solvent comprises between about 10 percent to about 87 percent of the composition. In still a further detailed embodiment, the bis-silane includes other silanes. In a more detailed embodiment, the water soluble or dispersible polymer includes an epoxy resin. In a more detailed embodiment, the water soluble or dispersible polymer includes an acrylate resin. In another more detailed embodiment, the ratio of acrylate resin to epoxy resin is between about 8:2 to about 6:4. In yet another more detailed embodiment, the water soluble or dispersible polymer and the nanoparticles comprise more than 50 percent of the resulting mixture. In still another more detailed embodiment, the act of curing the resultant mixture on the substrate includes baking the substrate and resulting mixture. In still another more detailed embodiment, the act of baking the substrate and resulting mixture includes baking the substrate and resulting mixture in an environment above 100° C. for a duration of more than 5 minutes. In a further detailed embodiment, the bis-silane provides a siloxane network to bind the water soluble or dispersible polymer and the nanoparticles upon curing of the composition.

BRIEF DESCRIPTION OF THE DRAWINGS

FIG. 3 is a chart listing metals and forms of corrosion where bis-silane films have been demonstrated to be very effective;

FIG. 6 is a chart reflecting the compositions and parts relative to one another evaluated in Experiment 1;

FIG. 7 is a chart listing exemplary coating compositions evaluated in accordance with the present invention in Experiment 1;

DETAILED DESCRIPTION OF THE EXEMPLARY EMBODIMENTS

Organofunctional silanes have been shown to be powerful systems for protecting a wide range of metals against corrosion. However, there exists a need for a coating which: a) adheres very well to the metal and is paintable by common paint systems such as, for example, epoxies, polyesters, acrylates, and polyurethanes, as well as improving adhesion of both soft (e.g. rubber adhesion to tire cord) and hard materials (structural adhesives); b) protects major engineering metals such as, for example, carbon steel, galvanized steel, stainless steel, aluminum alloys and magnesium alloys against common forms of corrosion, including localized attack such as pitting, stress corrosion cracking (SCC) and corrosion fatigue cracking (CFC); c) contains minimal additives such as dyes and inhibitors; d) is effectively devoid of chromates or other toxic components; e) has little or no volatile organic compounds (VOCs); and, f) is water soluble. The integrated organosilane system meeting these goals could replace the chromate system entirely including all chromate pretreatment and all corrosion-inhibiting chromate pigments. An exemplary application of such a coating might be directed to the sheet metal industry as a coil pretreatment prior to painting.

The present invention, which, in the exemplary embodiment, provides a coating meeting the aforementioned goals, comprises at least one organofunctional silane, an organic resin and a nanoparticle filler. The novel primer, dubbed the "superprimer" is amenable to dipping, spraying, wiping or brushing onto any clean metal surface. No conversion coating, either phosphate or chromate, is required. One of the principles underlying the present invention is the hydrophobicity transition exhibited by organosilanes. While the unpolymerized silanes are hydrophilic and water soluble, they become highly hydrophobic on deposition, resulting in extremely low water-transmission rates.

Optimization of silane films involves a number of seemingly contradictory requirements. It is desirable that the film precursors are hydrophilic to permit water-borne deposition. On the other hand, it is desirable that the film itself be very hydrophobic to assure superior protection. Also, it is desirable that the silane films be thin enough to be pore free yet thick enough to provide an adequate barrier to water penetration. Thin organosilane prior art films have been dense and have shown the required hydrophobicity, but lacked toughness. Thick films, on the other hand, were porous and susceptible to cracking and typically had reduced hydrophobicity.

Figure 1:
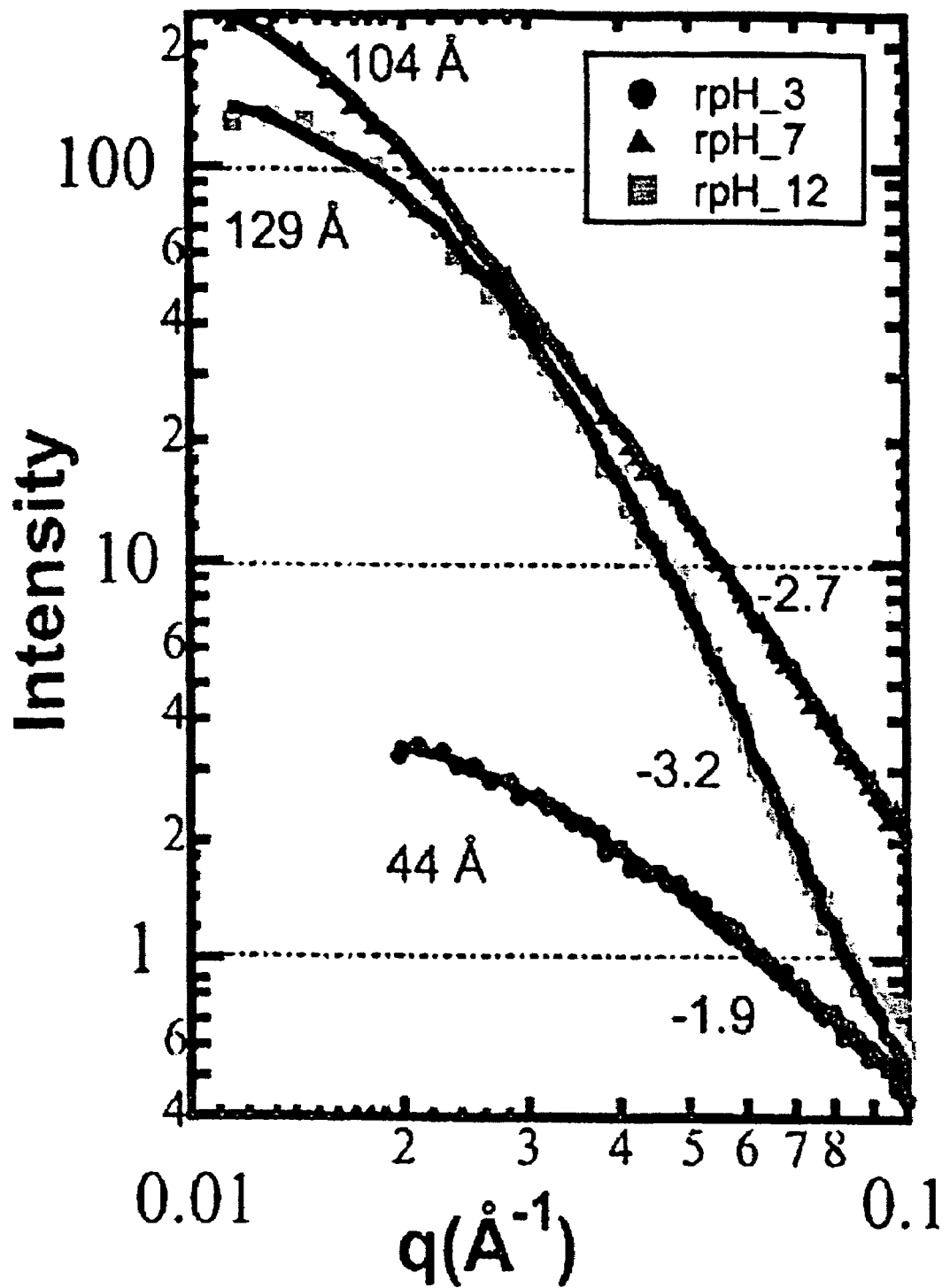
FIG. 1 is a graphical representation of small angle X-ray scattering (SAXS) from tetramethylorthosilicate (TMOS) polymerized at three pH values.

Depending upon the pH of the reacting solutions, simple silicates in solution can form structures ranging from compact particles to weakly branched polymers. The nature of these solution precursors, in turn, controls the porosity of dried solids formed by removal of the solvent. The structure of solution precursors can also be manipulated to control film density and hydrophobicity. FIG. 1 shows small angle X-ray scattering (SAXS) from tetramethylorthosilicate (TMOS) polymerized at three pH values. The data show that increasing pH leads to larger, denser structures. At pH=7 and below branched polymers are formed, whereas, above pH=7 the structure is colloidal.

The toughening of films with organic polymers and nanoparticles adds an additional dimension to the structure-property problem. Homogeneous microstructures of the type needed for corrosion coatings are rare and only result when the compatibility of the phases is properly managed throughout the deposition process. This problem is particularly severe when the matrix silane is undergoing a hydrophobicity transition.

Finally, it is desirable that any practical coating system support a variety of deposition methods such as dip coating, spraying and brushing. It is well known, however, that the nature of the final film in a reactive-evaporative system depends on the physics and chemistry active during the deposition process. The transient gel-like state that exists at the drying front may ultimately determine the density of the film.

It is well known that the density of films deposited from silicate solutions depends on the chemical processes active in the solution precursors. This fact is exploited, for example, in the formation of anti-reflective coatings where silicates are pre-polymerized prior to dip coating. Indeed, the advantage of sol-gel coating is precisely the ability to control the microstructure of films using solution chemistry.

In polymerizing systems such as organofunctional silanes, there is an intimate interplay of chemical and physical process that actually determines the morphology of the final film. The received wisdom is that evaporation forces the silane precursors together leading to rapid condensation right at the drying front. As a result, in dip coating, an open, possibly quite rigid, gel-like network forms as the film deposits. In spray or spin coating, evaporation leads to a skin that impedes subsequent solvent release.

Of particular concern is that the gel network will resist collapse, rendering the film porous. For effective corrosion protection dense hydrophobic films are required. To achieve such films, management of the condensation reactions and evaporation rate assures that rigidity sets in only after the solvent has evaporated.

The level of corrosion performance correlates with the formation of an interfacial reaction product between the silane film and the metal oxide. In other words, effective bis-silanes are actually conversion coatings that form a complex silicate layer with a high ohmic resistivity and low electrolyte permeability. These silicate layers differ from conventional sol-gel coatings, which are subject to facile hydrolysis. Therefore, the superior performance of bis-silane films is likely related to the nature of the interfacial conversion product.

When used as a corrosion protection treatment without paint, prior art silane films had limitations in that the film thickness could not be greater than about 0.3 µm. Such silane films were brittle when deposited at greater thickness. Although these thin films provide a remarkable level of protection against various forms of corrosion, they are easily damaged. Therefore, the present invention is directed to a coating with a greatly enhanced film builds generally from 0.1 µm to 20 µm. The increased film build will in part be the result of the incorporation of nanoparticles, which will interact strongly with the silane molecules. The present invention is a superprimer generally comprising the following components:

1. One or more of an organofunctional silane, preferably a bis-silane. An exemplary group of bis-silanes shown to be effective in the present invention are:
bis-[triethoxysilyl]methane $(XO)_3$—Si—$CH_2$—Si—$(OX)_3$;
bis-[triethoxysilyl]ethane $(XO)_3$—Si—$(CH_2)_2$—Si—$(OX)_3$;
bis-[triethoxysilyl]octane $(XO)_3$—Si—$(CH_2)_8$—Si—$(OX)_3$;
bis-[triethoxysilylpropyl]amine $(XO)_3$—Si—$(CH_2)_3$—NH—$(CH_2)_3$—Si—$(OX)_3$;
bis-[triethoxysilylpropyl]ethylenediamine $(XO)_3$—Si—$(CH_2)_3$—NH—$(CH_2)_2$—NH—$(CH_2)_3$—Si—$(OX)_3$;
bis-[triethoxysilylpropyl]disulfide $(XO)_3$—S—$(CH_2)_3$—NH—$S_2$—Si—$(OX)_3$;
bis-[triethoxysilylpropyl]tetrasulfide $(XO)_3$—Si—$(CH_2)_3$—NH—$S_4$—Si—$(OX)_3$; and,
bis-[triethoxysilylpropyl]urea $(XO)_3$—Si—$(CH_2)_3$—NH—CO—NH—$(CH_2)_3$—Si—$(OX)_3$, where:

$X=CH_3$ or $C_2H_5$ (methoxy or ethoxy)

2. A low-molecular weight water soluble polymer or copolymer as well as higher molecular weight polymers having been end-functionalized so as to become water soluble or dispersible. This polymer or copolymer is generally selected from the classes of: epoxy, polyester, polyurethane or acrylate.

3. A pigment, comprising nanoparticles generally having a size on the order of 0.01-500 nm. The particles may be: metal oxides that adsorbs silanes such as zinc oxide, aluminum oxide, iron oxide, magnesium oxide and silica; phthalocyanines; sulfides; silicone oils such as xanthene and anthraquinone dyes; vat dyes such as 3-hydroxyindole (indoxyl), 7,8,7,8-dibenzothioindigo, pyranthrone and indanthrene brilliant orange. The pigment may be dispersed into the coating by sol-gel methods or by high-shear blending.

4. A water soluble inhibitor for corrosion protection of metals that will be leachable from the coating at a controlled rate. This component is variable in that it is selected on the basis of the substrate. A wide range of inhibitors is available commercially for steels, aluminum alloys, zinc and brass. Exemplary inhibitors include: salt of trivalent cerium (Ce); salt of trivalent lanthanum (Le); salts of yttrium (Y); molybdates; phosphates; phosphonates; phosphomolybdates; vanadates; borates; amines; glycolates; sulfenamides, tungstates, and various mixtures of the above. The concentration of this inhibitor will generally less than 1.0% of the resultant superprimer.

5. Additional components such as emulsifiers, surfactants, film builders, UV absorbers or reflectors, thickeners, or toughening agents such as end-functionalized silicones. These components are present in very low concentrations on the order of 0.5% solids. Examples of such UV absorbers and reflectors include zinc oxide (ZnO) and titanium dioxide ($TiO_2$).

The functional group in the silane is selected such that it reacts with the functional group in the polymer backbone. For instance, the hydroxide groups (—OH) in epoxies will react with the secondary amine groups in the silane, bis-[triethoxysilylpropyl]amine or bis-[triethoxysilylpropyl]ethylenediamine. It has been shown that mixtures of two silanes may be markedly more effective than individual silanes alone. By increasing the concentration of the silanes to the degree taught by the present invention, the silanes not only cross-link with the polymer, but also cross-link with themselves and form a three-dimensional siloxane network. This network will be interpenetrated with the cross-linked polymer. The cross-linked polymer or copolymer is generally a low-molecular weight, approximately 500 grams on the low side, that is water soluble polymer and may include or be supplanted by a higher molecular weight polymer having been end-functionalized so as to become water soluble or dispersible. This polymer or copolymer may be an epoxy, a polyester, a polyurethane, an acrylate or a modified polymer such as polyvinylidene fluoride.

The result of such a composition is a much thicker and denser film than one produced using a silane alone or a polymer film alone. Since the siloxane network is very hydrophobic, the film will have an extremely low permeability to water. The silane film alone would be brittle in high thicknesses, but the presence of the interpenetrated polymer will result in a much more pliable and formable material. One could argue that the polymer acts as a toughener of the silane film.

A dense, uniform silane film as provided for in the present invention can be achieved by a balance of forces. This balance is, however, even more critical when one of the components is undergoing a hydrophobicity transition. At some point the components of the system will be thermodynamically incompatible unless specific steps are taken to assure compatibility.

The domain size of hybrid systems of the present invention are controlled by a balance of entropic and enthalpic forces. The former are largely determined by the matrix cross-link density and the latter can be managed through interface-active agents. In addition, systems may be chosen that are amenable to formation of cross-links between the organic and inorganic phases. Inter-phase coupling acts like an attractive force and imparts compatibility to otherwise incompatible polymers. The inter-phase cross-linking should be managed, however, since the growth of molecular weight in the early stages of the cross-linking reaction can actually induce phase separation.

Figure 2:
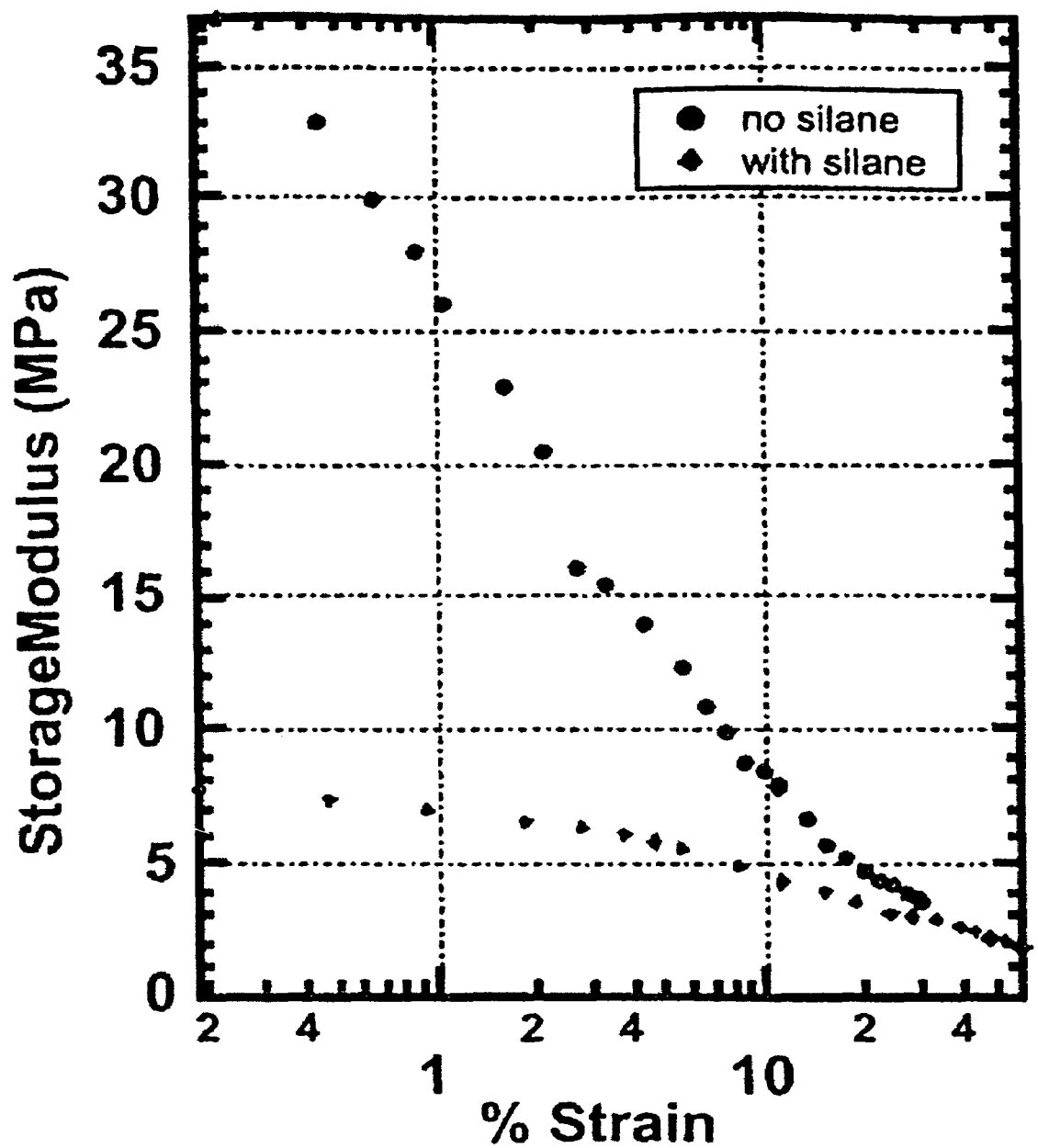
FIG. 2 is a dynamic mechanical analysis (DMA) relative to two-phase films with and without organosilane treatment.

Prior art reinforced polymers often show a sharp decline in the storage modulus with strain due to break-up of a percolated filler networks. This phenomenon is called the Payne effect and is routinely used in the rubber industry to quantify filler topology. FIG. 2 demonstrates a dynamic mechanical analysis (DMA) relative to two-phase films with and without organosilane treatment. The figure shows the dynamic mechanical response of a freestanding styrene-butadiene elastomer film reinforced with nanophase silica. The upper curve, for virgin hydrophilic silica, shows a high modulus and a very large Payne effect (reduction of the modulus with strain). When this powder is rendered hydrophobic by organosilane treatment prior to incorporation in the elastomer, however, both the modulus and the Payne effect are dramatically reduced (lower curve). This reduction is obtained because the silane treatment reduces the polymer-filler interfacial energy and therefore eliminates the tendency of the filler to "phase separate" and form the percolated network.

The bis-silane of the present invention is clearly playing multiple roles, which presumably account for the effectiveness of these films. Linkage to the polymer (through the functional groups) provides toughening, and cross-linking of the bis-silane with itself leads to a hydrophobic network with extremely low water permeability. In addition, the silane anchors the film to the metal substrate by formation of covalent bonds. The present invention is therefore covalently linked to the metal by the coupling agent through the formation of a cross-linked interfacial layer of a siloxane that also contains metal ions.

The present invention underlies that while other factors, such as porosity, oxide bonding, and corrosion inhibition are important, hydrophobicity is of primary concern. Hydrolyzed silanes are very hydrophilic due to the silanol groups. As a result, they readily adsorb on hydrophilic surfaces, such as metals, glass or metal oxide powders. After adsorption and curing they become hydrophobic, as they lose water and cross-link to form Si—O—Si units. The transition from hydrophilic to hydrophobic is what makes silanes, and therefore, the present invention so unique. No other surface treatment or coupling agent currently known shows this behavior. As an example, testing of the present invention has shown that the better corrosion performance films were prepared from the series bis-[tri(m)ethoxysilyl]alkane, where the alkane was methane, ethane, hexane or octane, was not offered by the methane silane, which has the highest number of Si—O-Metal bonds at the interface, but by the octyl silane, which has the highest hydrophobicity.

Because of the dominant influence of hydrophobicity, any coating system should completely encapsulate (or dissolve) any hydrophilic resin molecules, which are necessarily somewhat hydrophilic to assure dispersion in the carrier fluid. As in a water soluble system like the present invention, a transition upon curing must take place that renders the entire film highly hydrophobic. In other words, it is crucial that phase separation between the siloxane and the resin be avoided or at least restricted to nanometer dimensions. FIG. 3 presents an overview of metals and forms of corrosion where bis-silane films have been demonstrated to be very effective.

The present invention is formulated by bis-silanes of the generic type $(XO)_3$—Si—$(CH_2)_3$—R—$(CH_2)_3$—Si—$(OX)_3$ which have been shown to perform much better than films of the well-known mono-silanes of the type $(XO)_3$—Si—$(CH_2)_3$—R. While mono-silanes may provide adhesion to polymers, e.g., paints, such adhesion does not result in adequate corrosion resistance of the painted metal. As an example of the corrosion inhibiting performance, it has been shown that AA2024-T3 (Aluminum alloy) can survive 2 weeks of ASTM B-117 salt spray after treatment with the present invention.

The film buildup and the mechanical strength of the present invention are further improved by a nanoparticle pigment that has a very high specific surface area. These particles are bonded to themselves and to the polymer by the silane. Some exemplary nanoparticles, having sizes generally between 0.01 nm to 500 nm, that have been shown to be effective in the present invention include: $Al_2O_3$, $TiO_2$, clay, zeolite, MgO, ZnO and $ZrO_2$. In a more specific range, the nanoparticles have sizes generally between 50 nm to 100 nm. The nanoparticles also improve the scratch resistance of the coating and lower its permeability to electrolyte. In fact, the nanoparticles may also accelerate the cure of the coating by catalytic effects.

Figure 4:
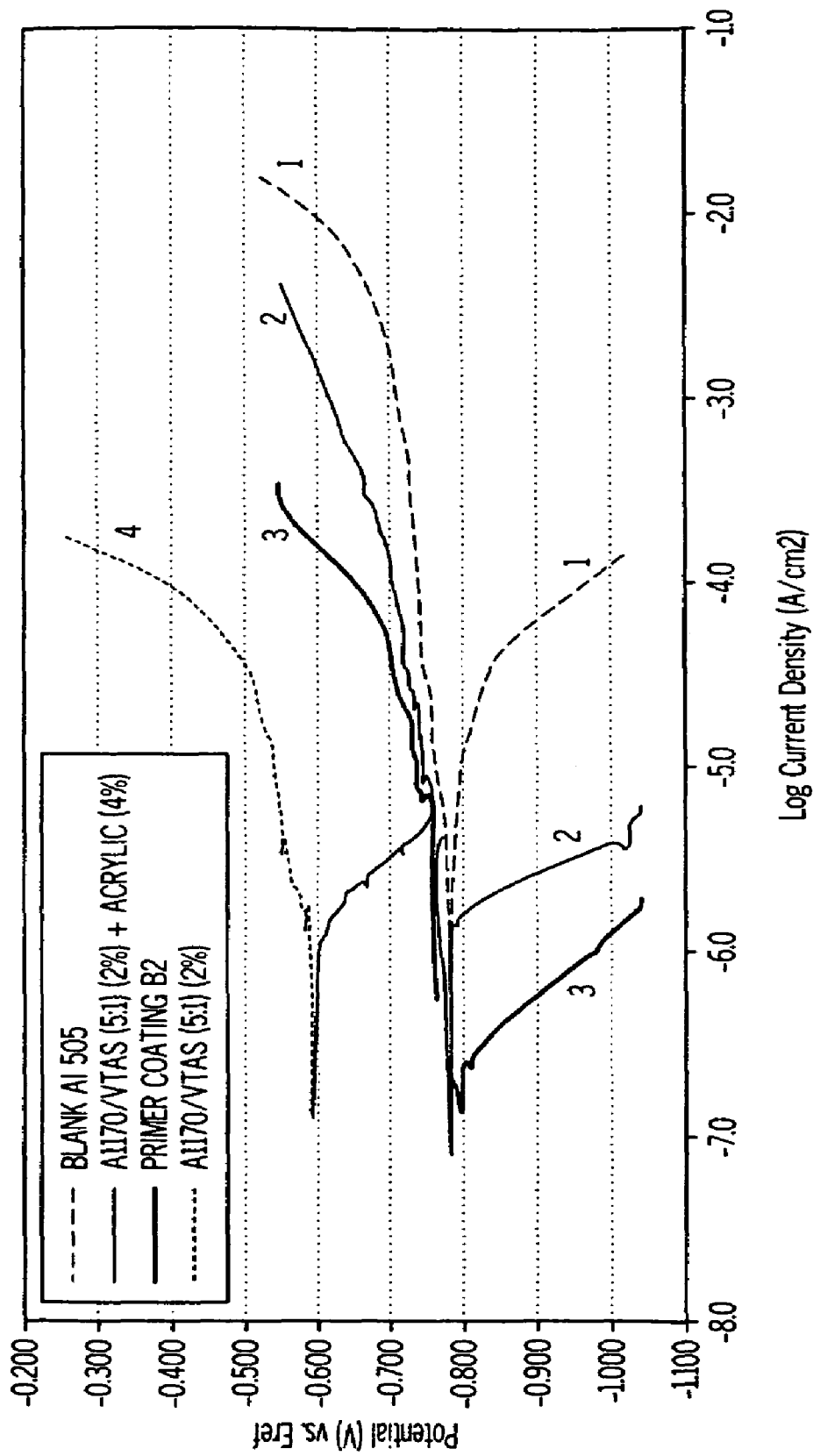
FIG. 4 is a set of polarization curves in 3.5% aerated NaCl of AA 2024-T3 alloy coated with silanes and resin or nanoparticle-modified silanes in accordance with the present invention.
Figure 5:
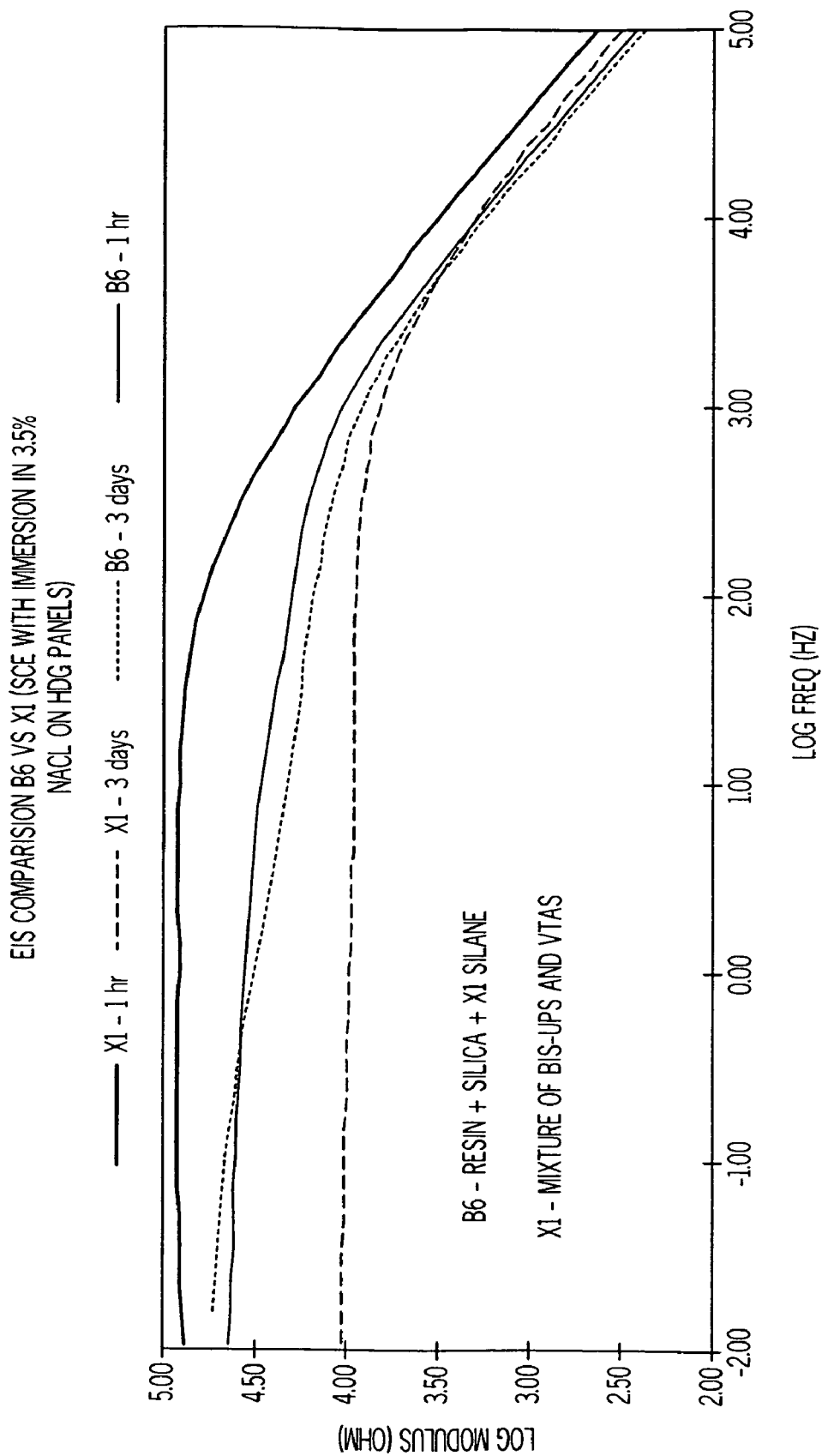
FIG. 5 is a graphical representation of electrochemical impedance spectroscopy (EIS) data obtained with exemplary embodiments of the present invention.

Preliminary direct current polarization and electrochemical impedance spectroscopy (EIS) data obtained with an exemplary embodiment of the present invention that included a resin enhanced silane system reinforced with a nanoparticulate silica, are shown in FIGS. 4 and 5. It can be seen that the resin has a strong affect and the addition of the silica changes the behavior further. The resistance to water of the mixed system was better than that of the silane film alone. The coating thickness was increased from 0.5 μm to about 5 μm. Excellent films of fairly high hardness were obtained.

FIG. 4 shows polarization curves in 3.5% aerated NaCl of AA 2024-T3 alloy coated with silanes and resin or nanoparticle-modified silanes; (1) untreated control; (2) coated with a water-based silane mixture of 2% concentration; (3) coated with the same silane mixture but now also containing 4% water soluble acrylic resin; (4) as (3), but now also containing 5% colloidal silica (exemplary embodiment of the present invention).

FIG. 5 shows EIS Bode plots of exemplary water soluble silane films on hot-dipped galvanized steel (HDG) in aerated 3.5% NaCl, showing a higher modulus after addition of an acrylic-styrene resin to the films (3 vs. 1) and the increased water resistance of the resin-containing system (4 vs. 2); 2 and 4 were obtained after 3 days of continuous immersion.

The test data pertaining to the present shows: a) a coating having a high resistance to solvents and other chemicals; b) a film thickness being variable and ranging from 1 μm to 20 μm; c) a coating curing thermally at or near room temperature; d) a coating withstanding mechanical deformation such as deep drawing, i.e., the coating is flexible; e) a coating that is UV resistant without overcoating; f) a coating that can be applied by dipping, wiping, spraying or brushing; g) a coating that is translucent allowing direct inspection of both the film and substrate; h) a coating that is thermally stable to at least 250° C. for one hour; and, i) a coating that is very hydrophobic (surface energy typically that of silanes, i.e., ~25 mJ/m$^2$).

The present invention is also compatible with conventional corrosion inhibition strategies. The function of a conventional inhibitor is to provide corrosion protection from nicks and scratches in the coating. Since the film produced by the present invention is densely cross-linked, a water soluble inhibitor may be added to the coating that leaches out very slowly due to the extreme hydrophobicity of the film. Some exemplary inhibitors that may be utilized in the present invention include: organophosphonates, useful for steel substrates; amines useful for steel and zinc substrates; benzothiazoles, useful on zinc substrates; cobalt ions, useful on zinc substrates; thioglycolates, useful on zinc substrates; tolyltriazole, benzocarboxytriazole and cerium ions, Ce(III), useful on aluminum alloy substrates; tobacco extract, useful on aluminum substrates; benzocarboxytriazole and tolytriazole, useful on aluminum alloy substrates. In other words, the present invention provides flexibility when choosing the inhibitor based on the target substrate. It is also a consideration to choose an inhibitor showing minimal chemical reactivity with either the silane or the resin. The inhibitor may also replace the defect healing capabilities of chromates used in conventional metal primers.

Other additives, such as a UV absorber are built-in if zinc oxide (a UV absorber) is selected as the nanoparticle, as silanes are known to adsorb on zinc oxide. However, nanoparticles of various types ($SiO_2$, $Fe_2O_3$, CuO) can be generated by in-situ sol-gel methods from alkoxy compounds. These particles can play a number of roles such as reinforcement, pigmentation and UV protection. The flexibility of the present invention also allows the use of $TiO_2$ as the UV scatterer in those cases where ZnO might lead to excessive heating of the coating.

These components comprising the present invention may be stored individually, optionally with the polymer being in an aqueous solution. Prior to use, these components in pure chemical form are mixed together, diluted with water, and then dispersed, using a high-shear blender in order to break down the agglomerated pigment particles. The resulting mixture is then applied to a clean metal object by dipping, spraying, wiping or brushing. The primer film is cured at room temperature for 24 hours or, preferable, by heating at around 100° C. for 1 hour. This preferred concentrations of the components of the mixture are: at least one silane comprising 30-40 volume %; a low-molecular weight polymer comprising 30-40 volume %; a nanoparticle pigment 20-30 volume %; additives comprising less than 1 volume %.

Experiment 1

All coating solutions are made by direct addition of the various components almost simultaneously and immediate high shear mixing for approximately 5 to 30 seconds. Extended mixing is known to heat the solution, which can induce premature polymerization. The total volume of the coating solutions produced is 100 ml.

Components: (1) Silane mixture—An bis-ureidoproplytrialkoxysilane(Y15445)/vinyltriacetoxysilane (VTAS), bis-trimethoxysilylpropylamine (A1170)/vinyltriacetoxysilane (VTAS), or an bis-ureidoproplytrialkoxysilane (Y15445)/ureidoproplytrialkoxysilane (UPS)/vinyltriacetoxysilane (VTAS) mixture is prepared before the coating addition. A pure silane oil mixture at a 4:1 or a 1/5/1 ratio respectively has been used. The mixture is allowed to react for at least 15 minutes before the silane is added.

(2) Resin—acrylic emulsions (Maincote PR-71, Rhoplex K-3) with approx. 50% (by weight) solids are added as received.

(3) Particles—a colloidal suspension of silica particles Snowtex PS-M (20% by weight) in water is added as received.

Substrates: Metal panels, hot-dipped galvanized G70 (HDG G70), were cleaned in a 7% KOH solution at 60-70° C. for 3-7 minutes and rinsed in deionized water before being coated.

Application and Cure: Coatings were applied by "drawn-down bar" technique consistent with normal paint/coating procedures. A # 28 bar was used, but most of the coatings displayed a low viscosity that might utilize a lower bar # for optimum application. Surfactant was added to reduce spotting. The coated panels were cured for one hour to a tack-free state, typically at 110° C., or 130° C. for Rhoplex K-3.

Testing: Direct current polarization was performed in 3.5% (by weight) NaCl with a platinum mesh electrode and a saturated calomel electrode (SCE). Electrochemical impedance spectroscopy (EIS) testing was done in 3.5% (by weight) NaCl with a saturated calomel electrode (SCE) and a graphite counter electrode. The data was collected at constant OCP, the panels were subjected to an electrolyte typically for one hour. Two scans were run for each sample. FIG. 6 reflects the various compositions evaluated.

Figure 8:
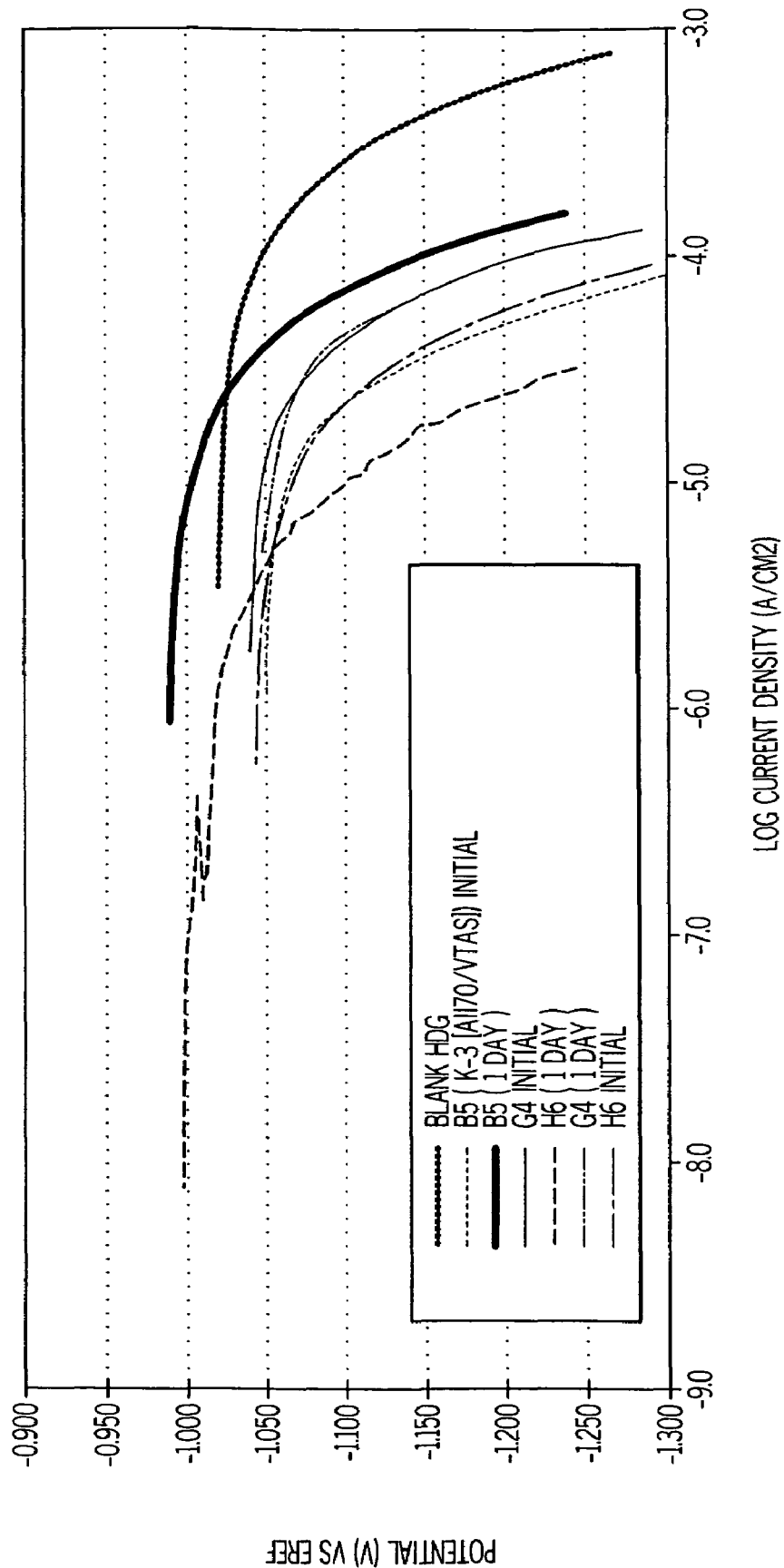
FIG. 8 is a graphical representation of direct current polarization data obtained from exemplary embodiments of the present invention in Experiment 1.
Figure 9:
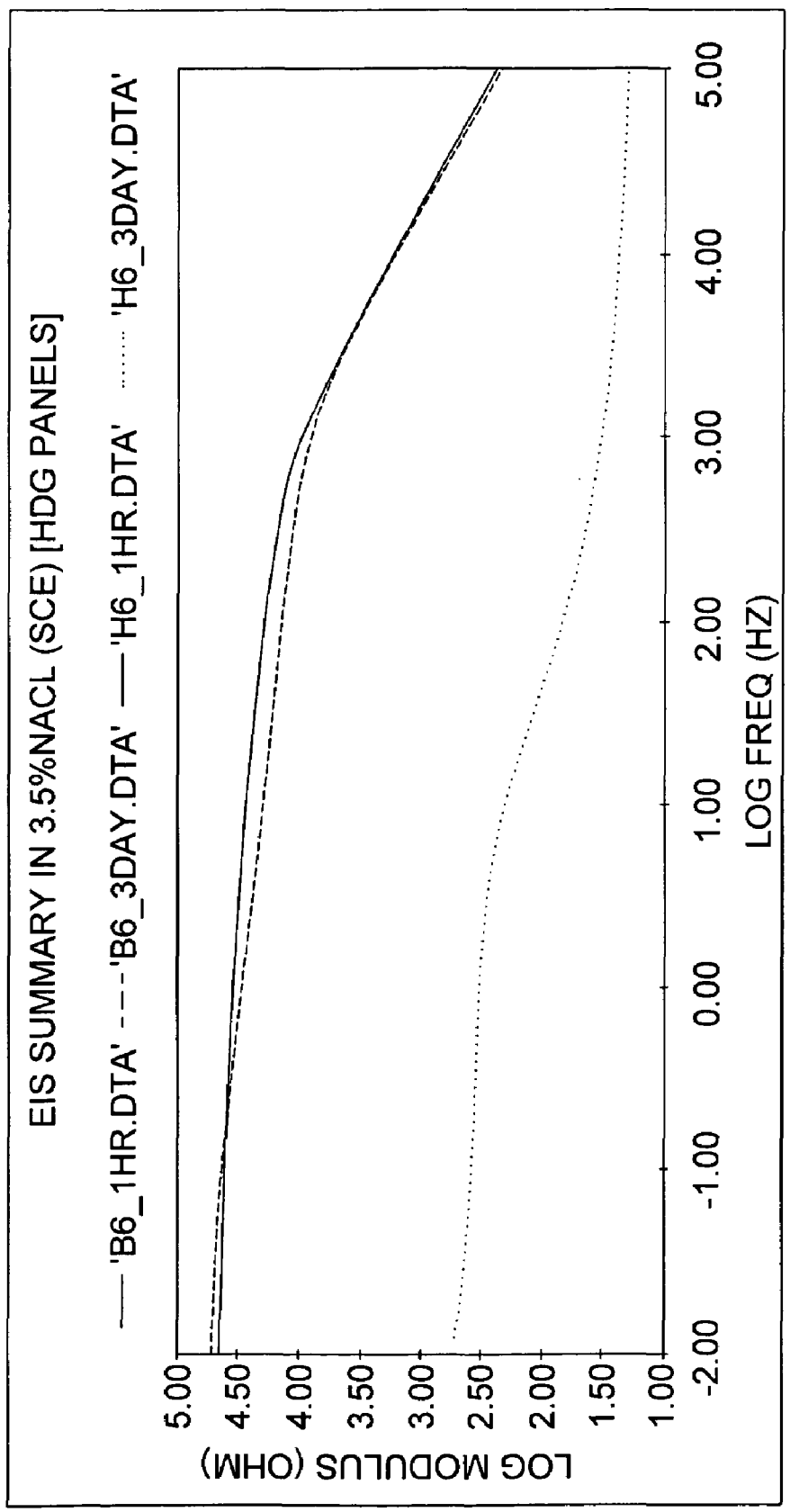
FIG. 9 is a graphical representation of electrochemical impedance spectroscopy (EIS) data obtained with exemplary embodiments of the present invention in Experiment 1.
Figure 10:
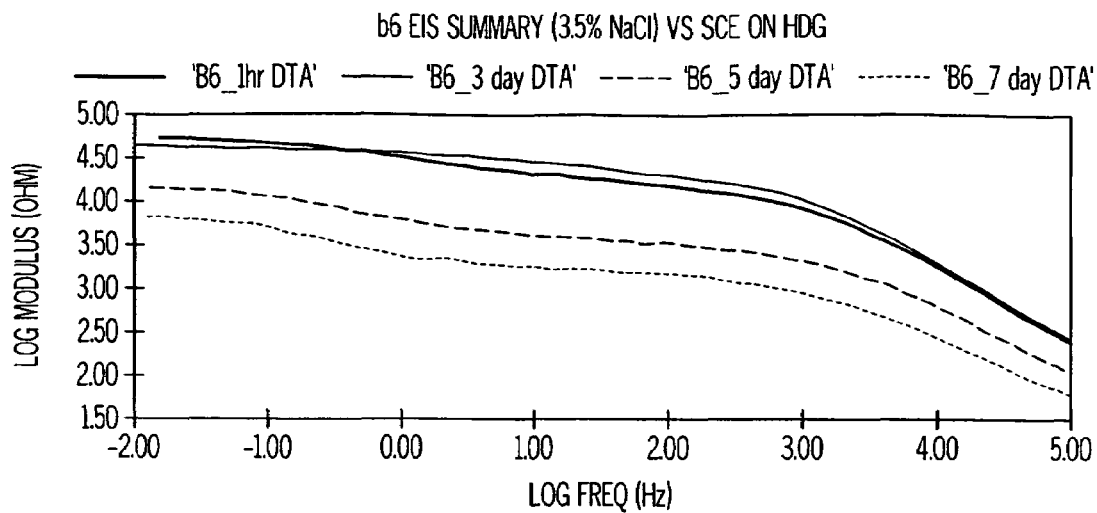
FIG. 10 is a graphical representation of electrochemical impedance spectroscopy (EIS) data obtained with exemplary embodiments of the present invention in Experiment 1.
Figure 11:
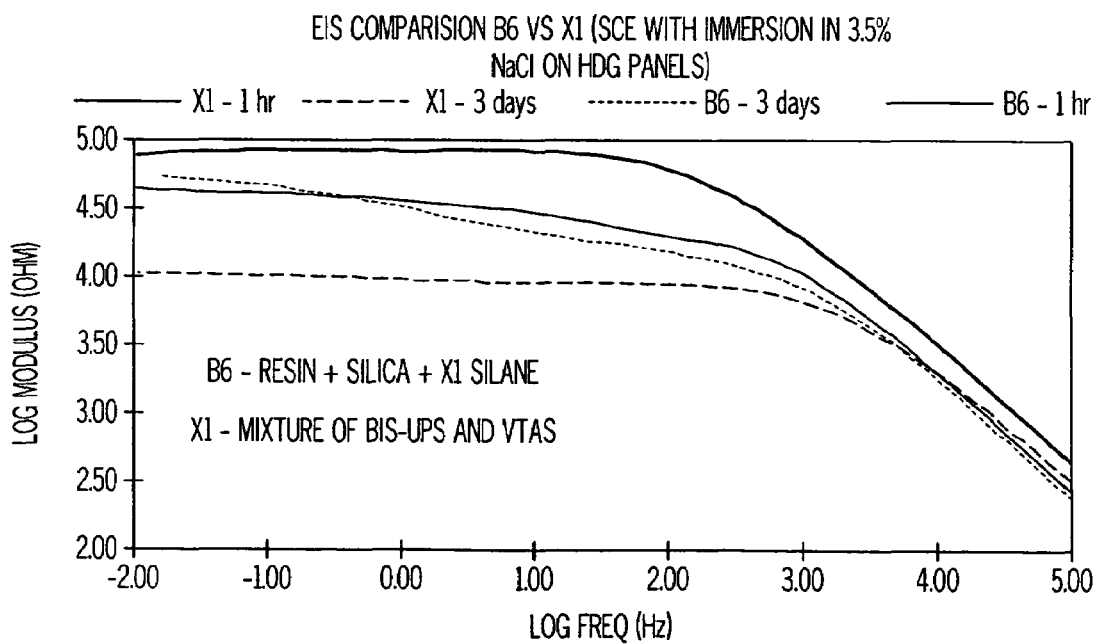
FIG. 11 is a graphical representation of electrochemical impedance spectroscopy (EIS) data obtained with exemplary embodiments of the present invention in Experiment 1.
Figure 12:
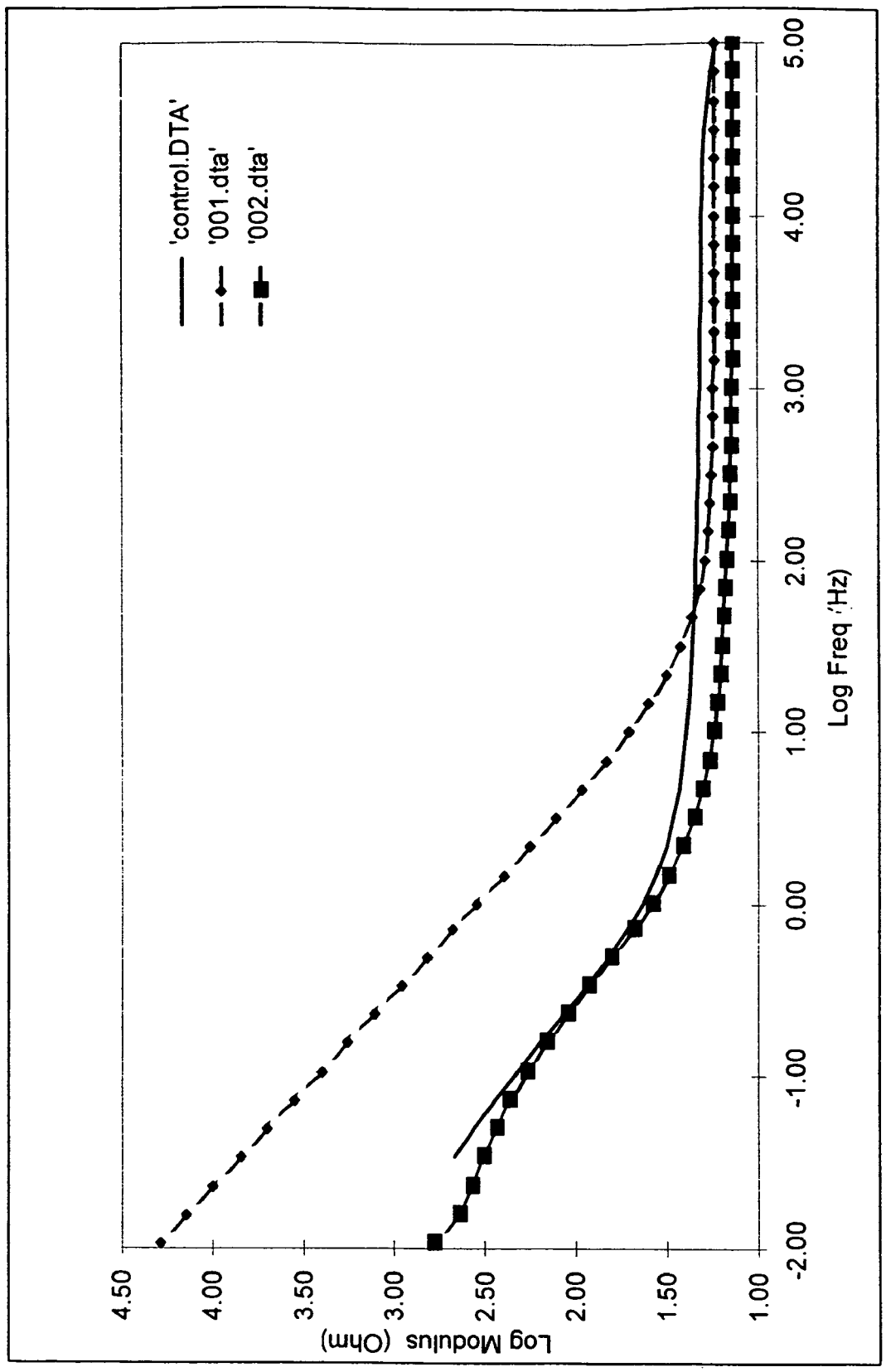
FIG. 12 is a graphical representation of electrochemical impedance spectroscopy (EIS) data obtained from the control formulation, experimental formulation #1, and experimental formulation #2 of the present invention in Experiment 2.
Figure 13:
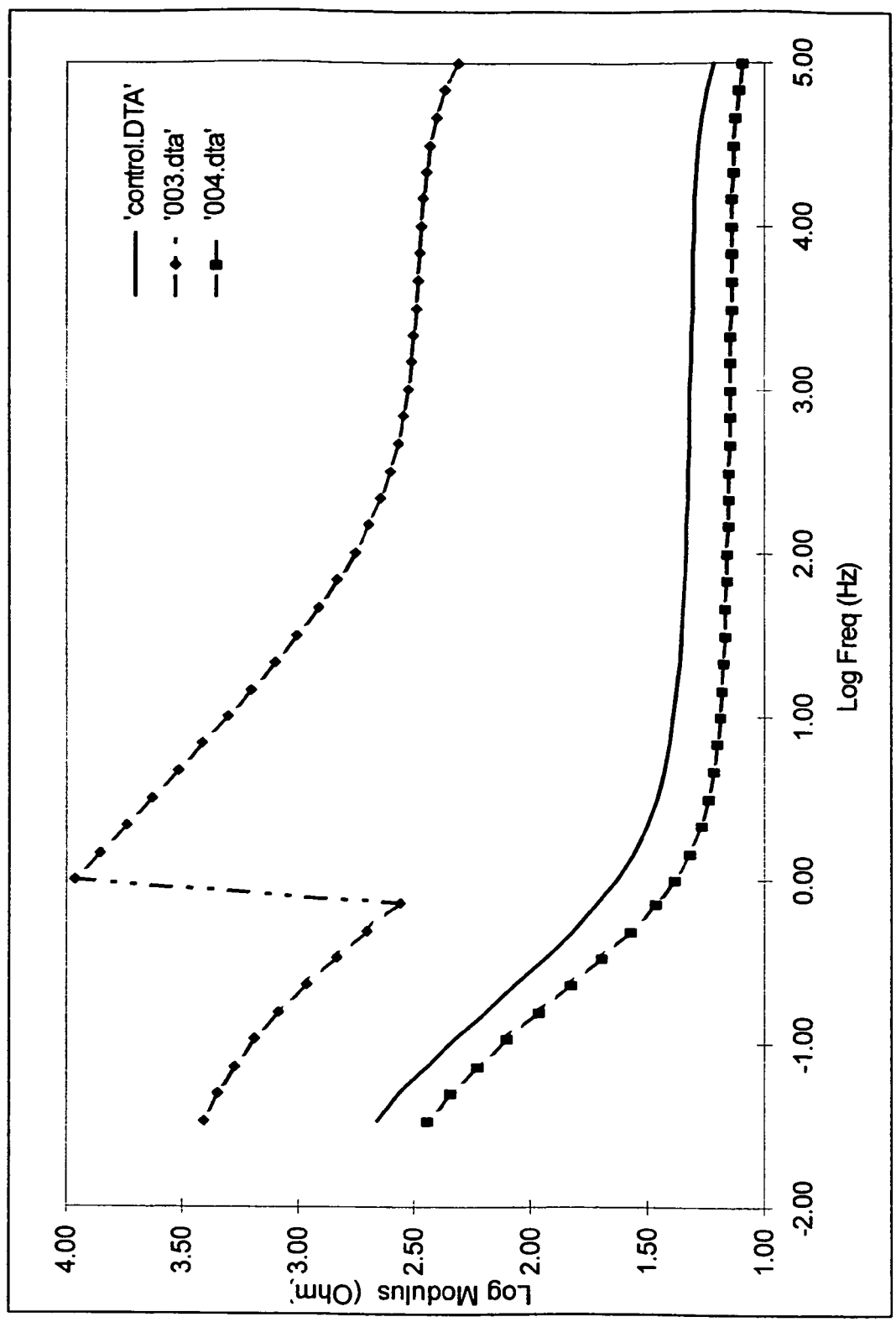
FIG. 13 is a graphical representation of electrochemical impedance spectroscopy (EIS) data obtained from the control formulation, experimental formulation #3, and experimental formulation #4 of the present invention in Experiment 2.
Figure 14:
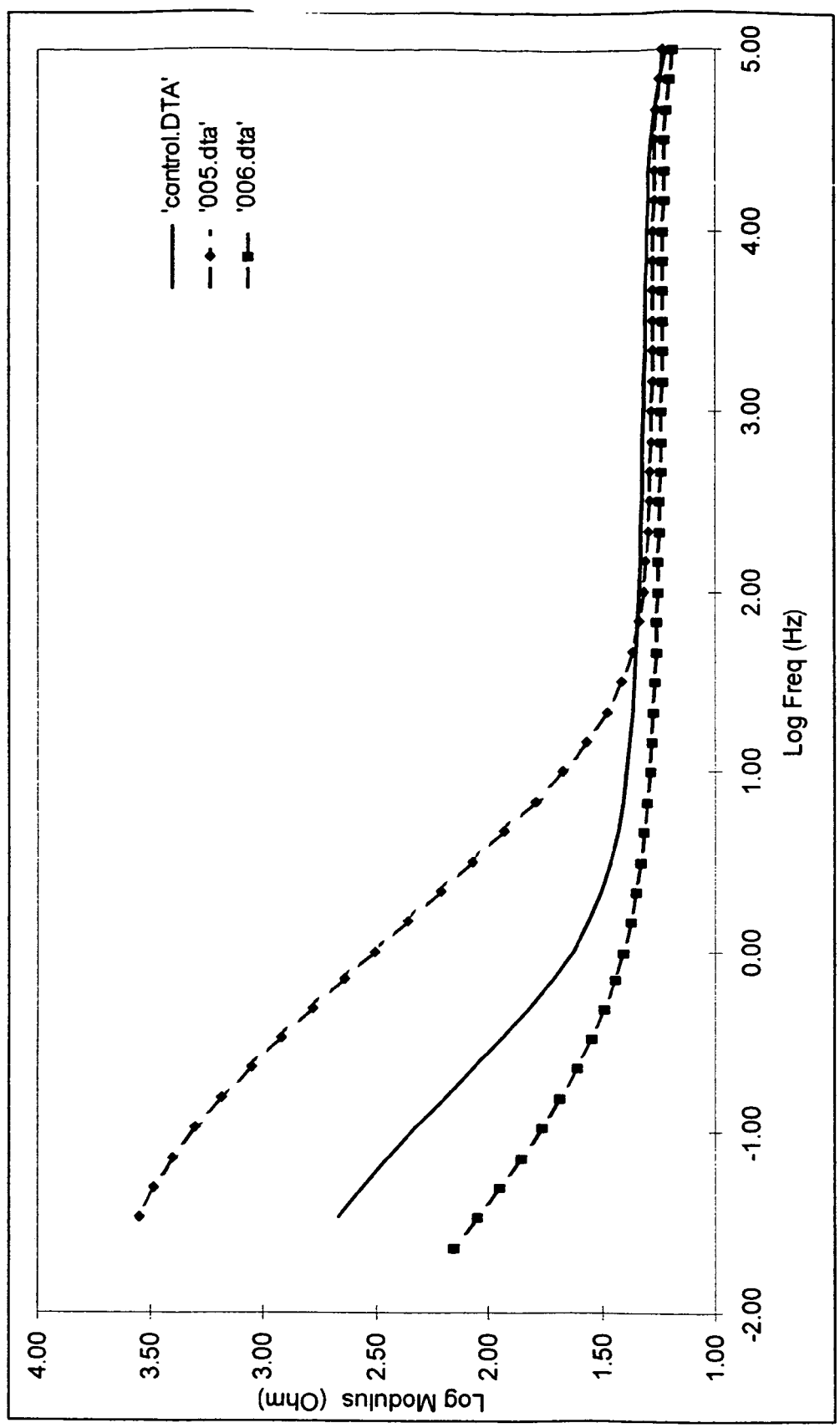
FIG. 14 is a graphical representation of electrochemical impedance spectroscopy (EIS) data obtained from the control formulation, experimental formulation #5, and experimental formulation #6 of the present invention in Experiment 2.
Figure 15:
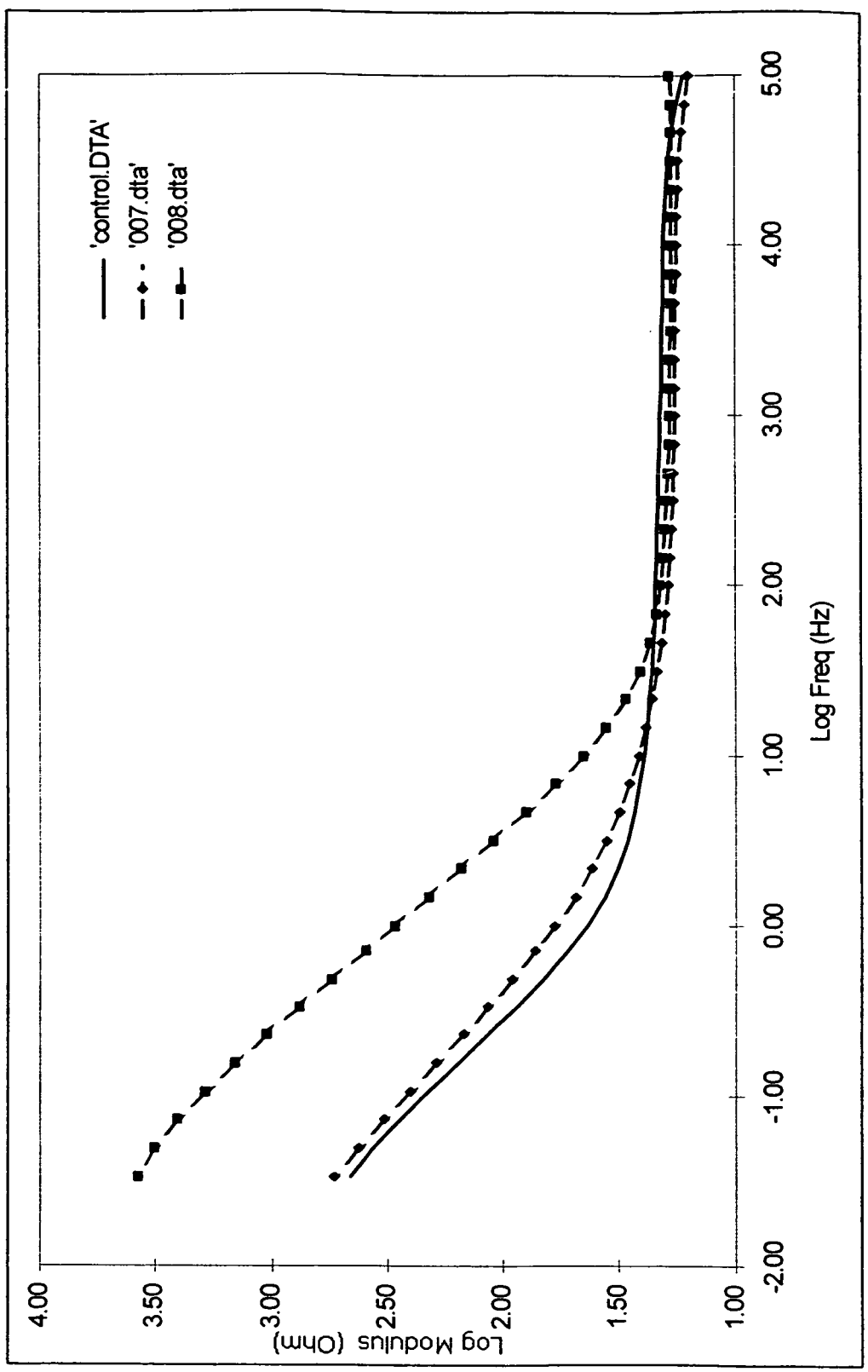
FIG. 15 is a graphical representation of electrochemical impedance spectroscopy (EIS) data obtained from the control formulation, experimental formulation #7, and experimental formulation #8 of the present invention in Experiment 2.
Figure 16:
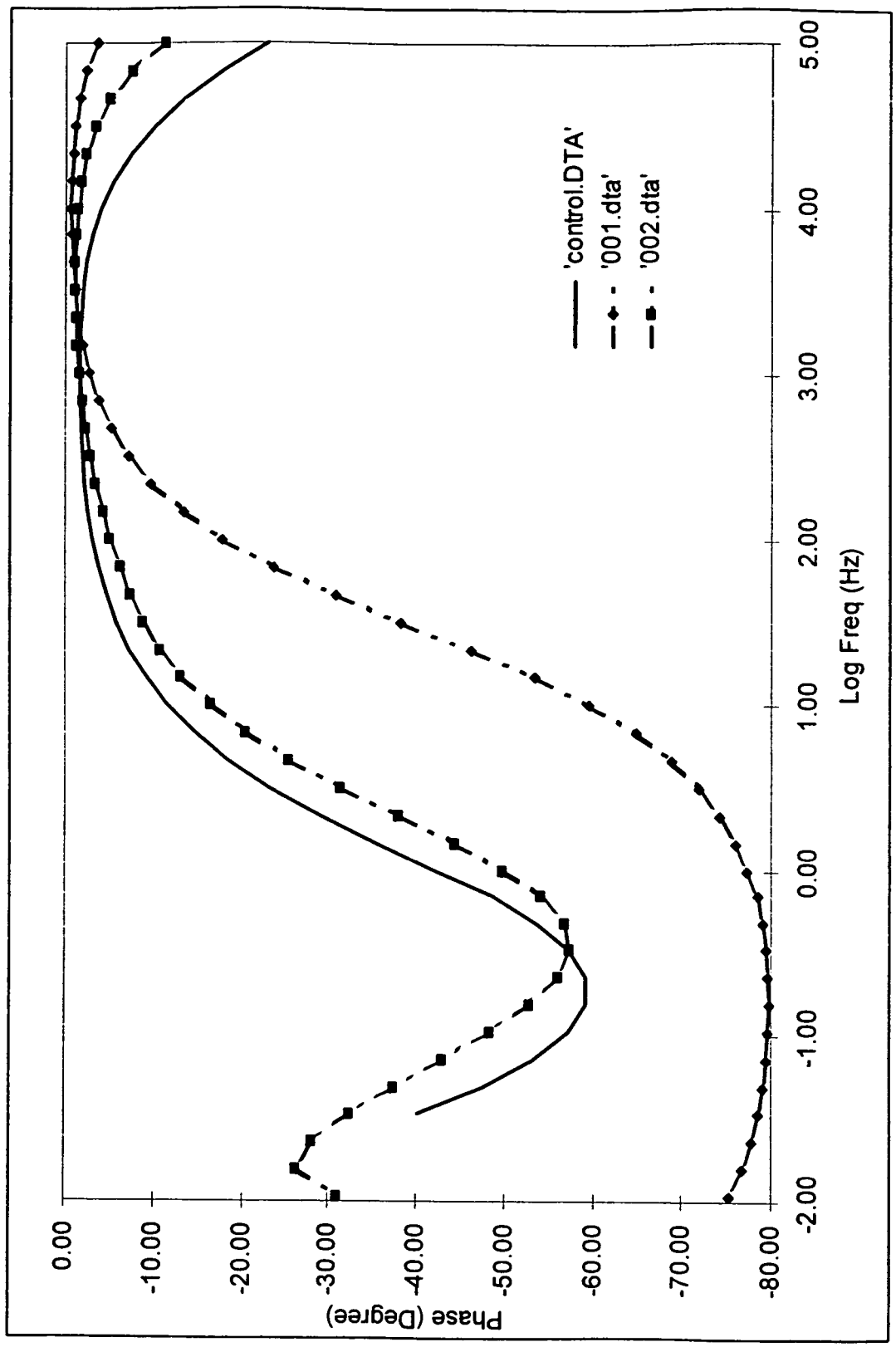
FIG. 16 is a graphical representation of electrochemical impedance spectroscopy (EIS) data in a Bode plot obtained from the control formulation, experimental formulation #1, and experimental formulation #2 of the present invention in Experiment 2.
Figure 17:
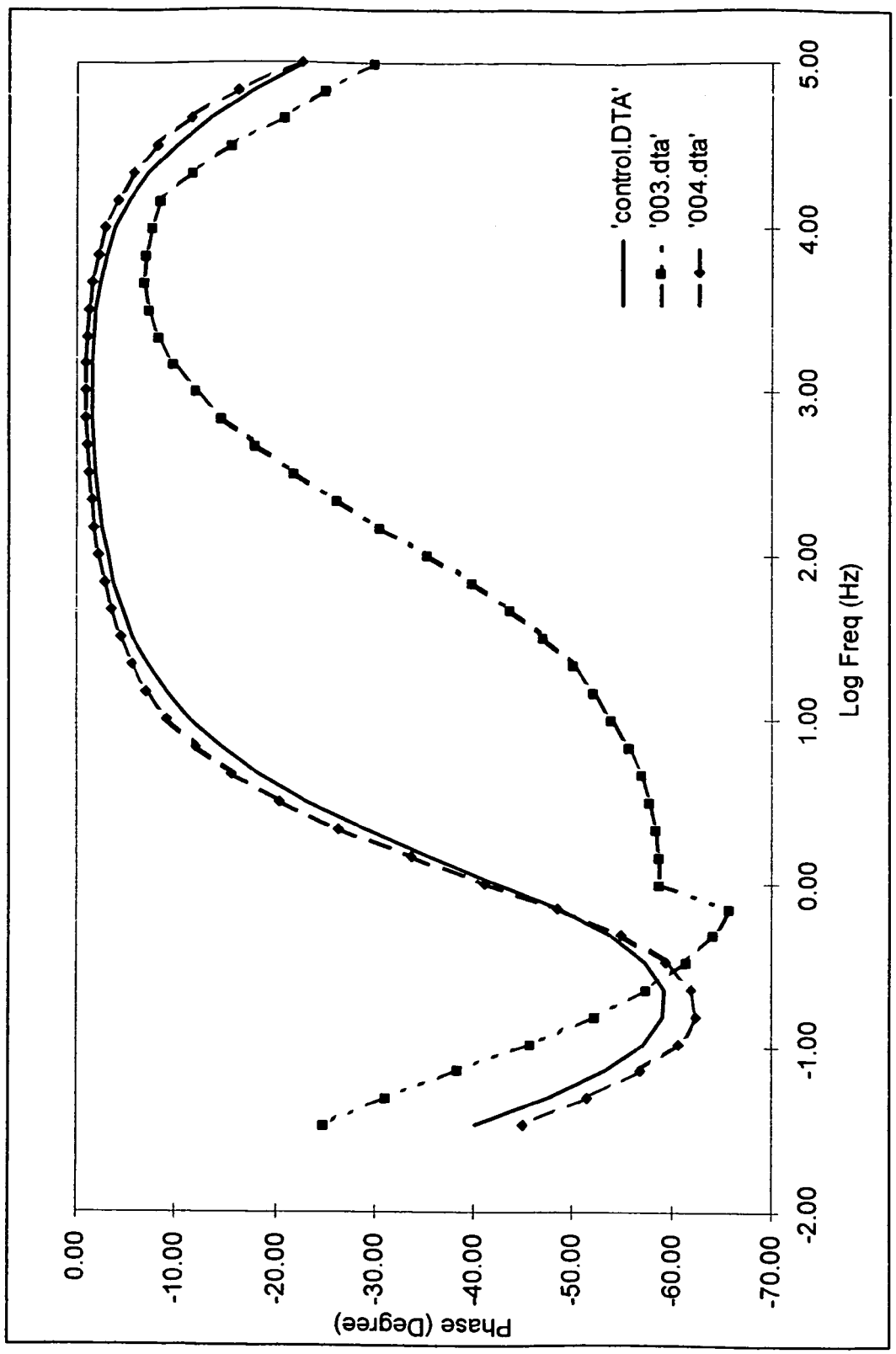
FIG. 17 is a graphical representation of electrochemical impedance spectroscopy (EIS) data in a Bode plot obtained from the control formulation, experimental formulation #3, and experimental formulation #4 of the present invention in Experiment 2.
Figure 18:
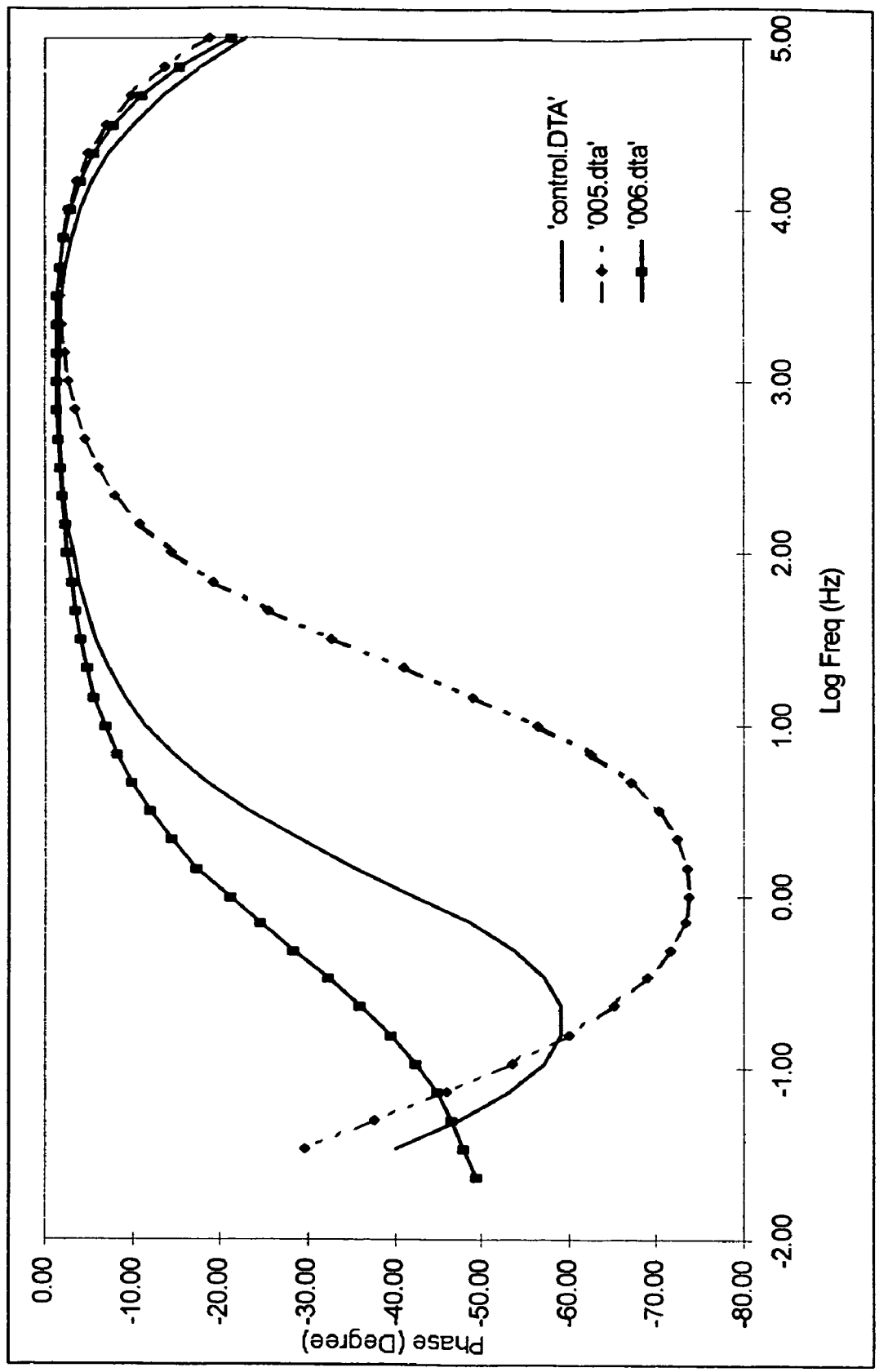
FIG. 18 is a graphical representation of electrochemical impedance spectroscopy (EIS) data in a Bode plot obtained from the control formulation, experimental formulation #5, and experimental formulation #6 of the present invention in Experiment 2.
Figure 19:
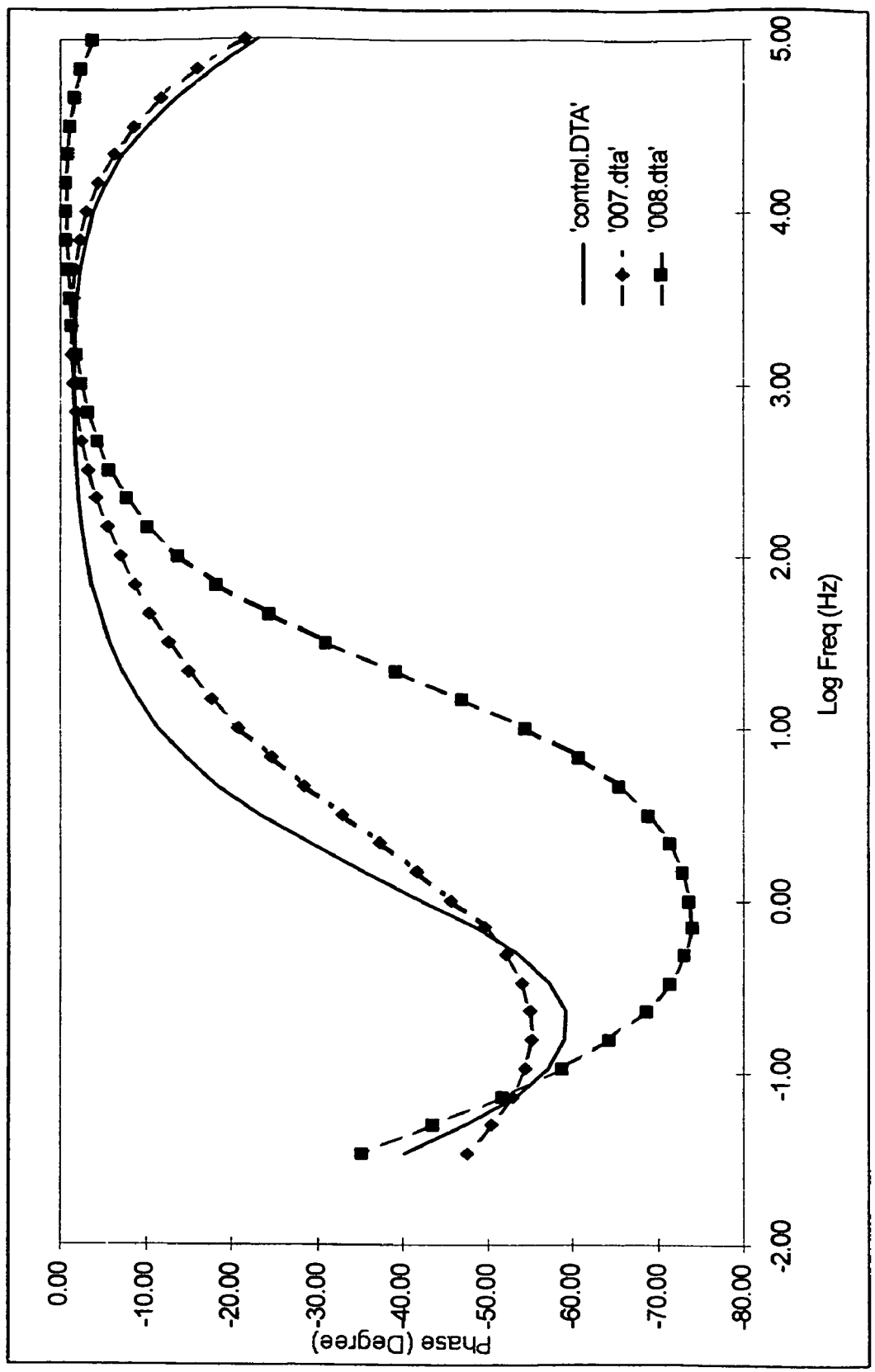
FIG. 19 is a graphical representation of electrochemical impedance spectroscopy (EIS) data in a Bode plot obtained from the control formulation, experimental formulation #7, and experimental formulation #8 of the present invention in Experiment 2.
Figure 20:
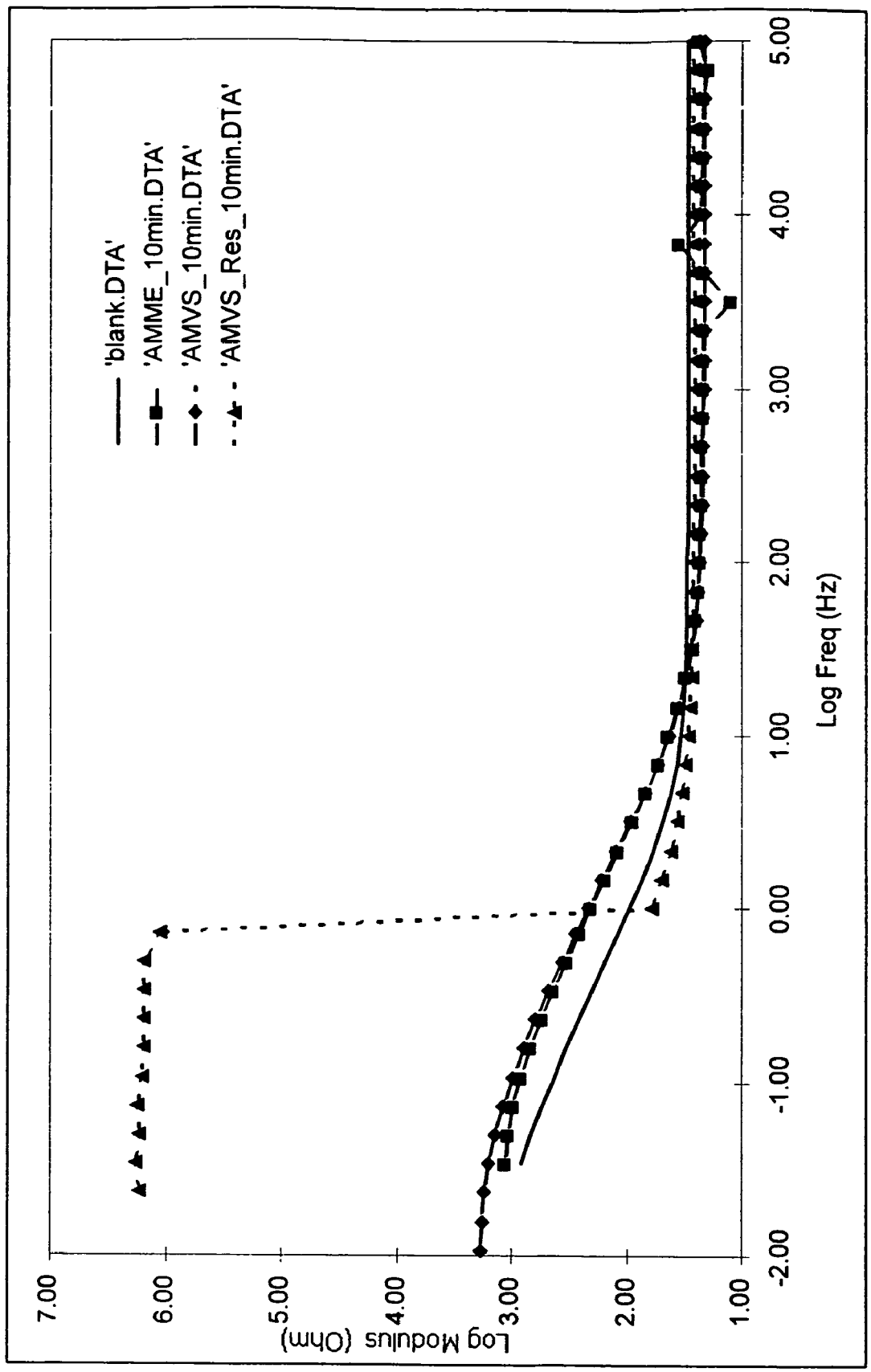
FIG. 20 is a graphical representation of electrochemical impedance spectroscopy (EIS) data obtained from the control formulation, experimental formulation of AMME cured for 10 minutes, experimental formulation of AMVS cured for 10 minutes, and experimental formulation of AMVS+Resin cured for 10 minutes in accordance with the present invention in Experiment 3.
Figure 21:
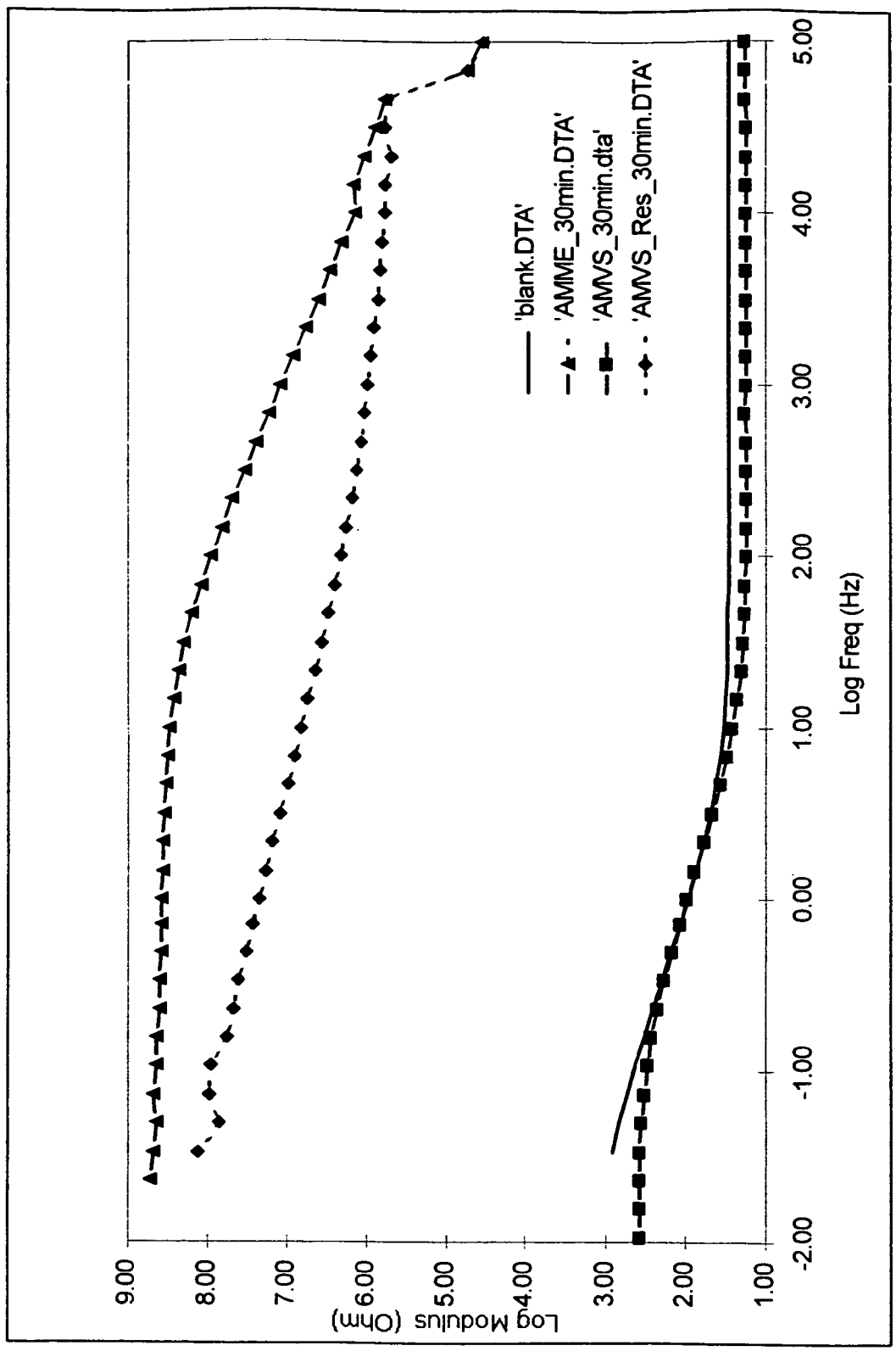
FIG. 21 is a graphical representation of electrochemical impedance spectroscopy (EIS) data obtained from the control formulation, experimental formulation of AMME cured for 30 minutes, experimental formulation of AMVS cured for 30 minutes, and experimental formulation of AMVS+Resin cured for 30 minutes in accordance with the present invention in Experiment 3.
Figure 22:
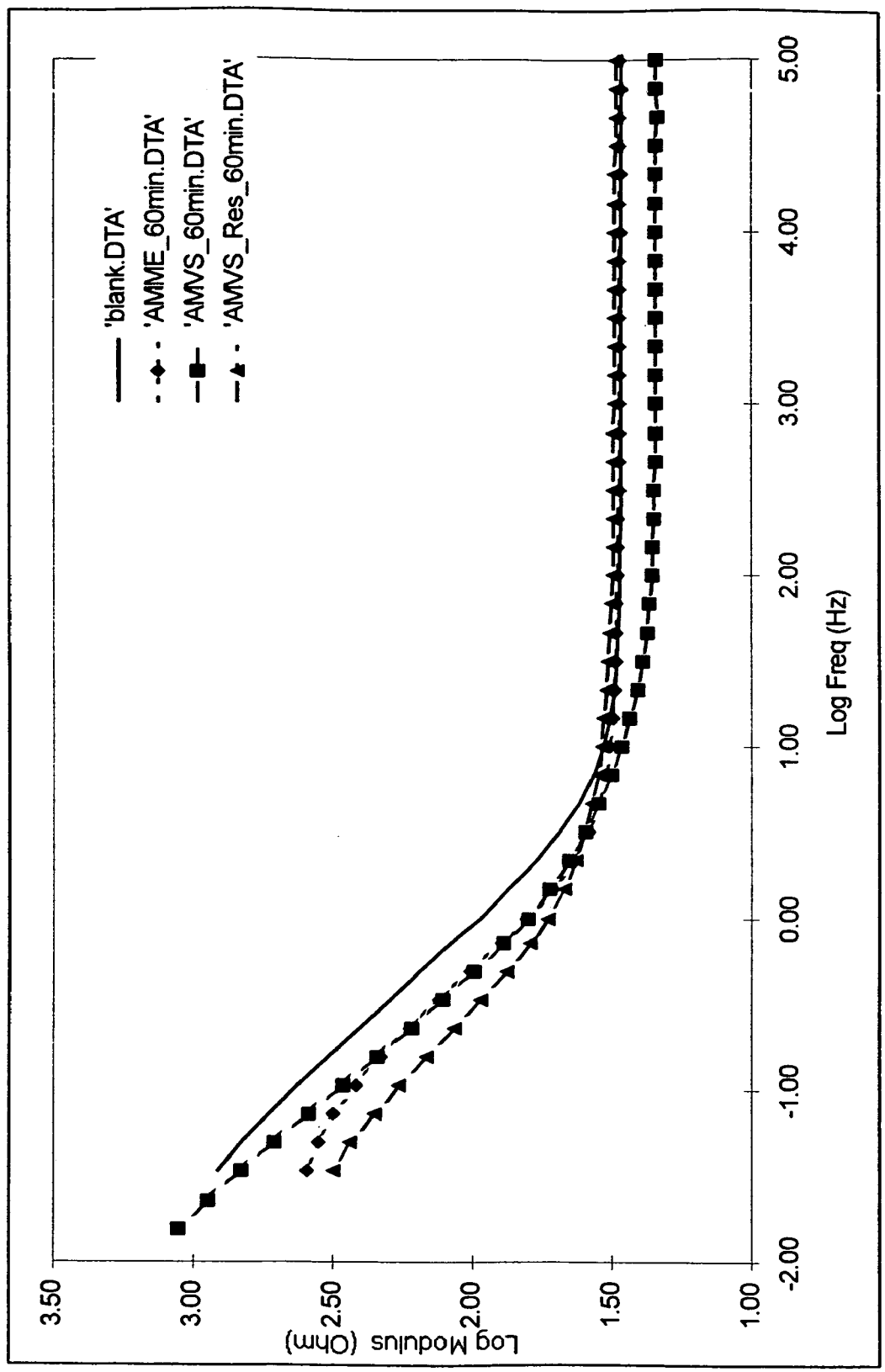
FIG. 22 is a graphical representation of electrochemical impedance spectroscopy (EIS) data obtained from the control formulation, experimental formulation of AMME cured for 60 minutes, experimental formulation of AMVS cured for 60 minutes, and experimental formulation of AMVS+Resin cured for 60 minutes in accordance with the present invention in Experiment 3.
Figure 23:
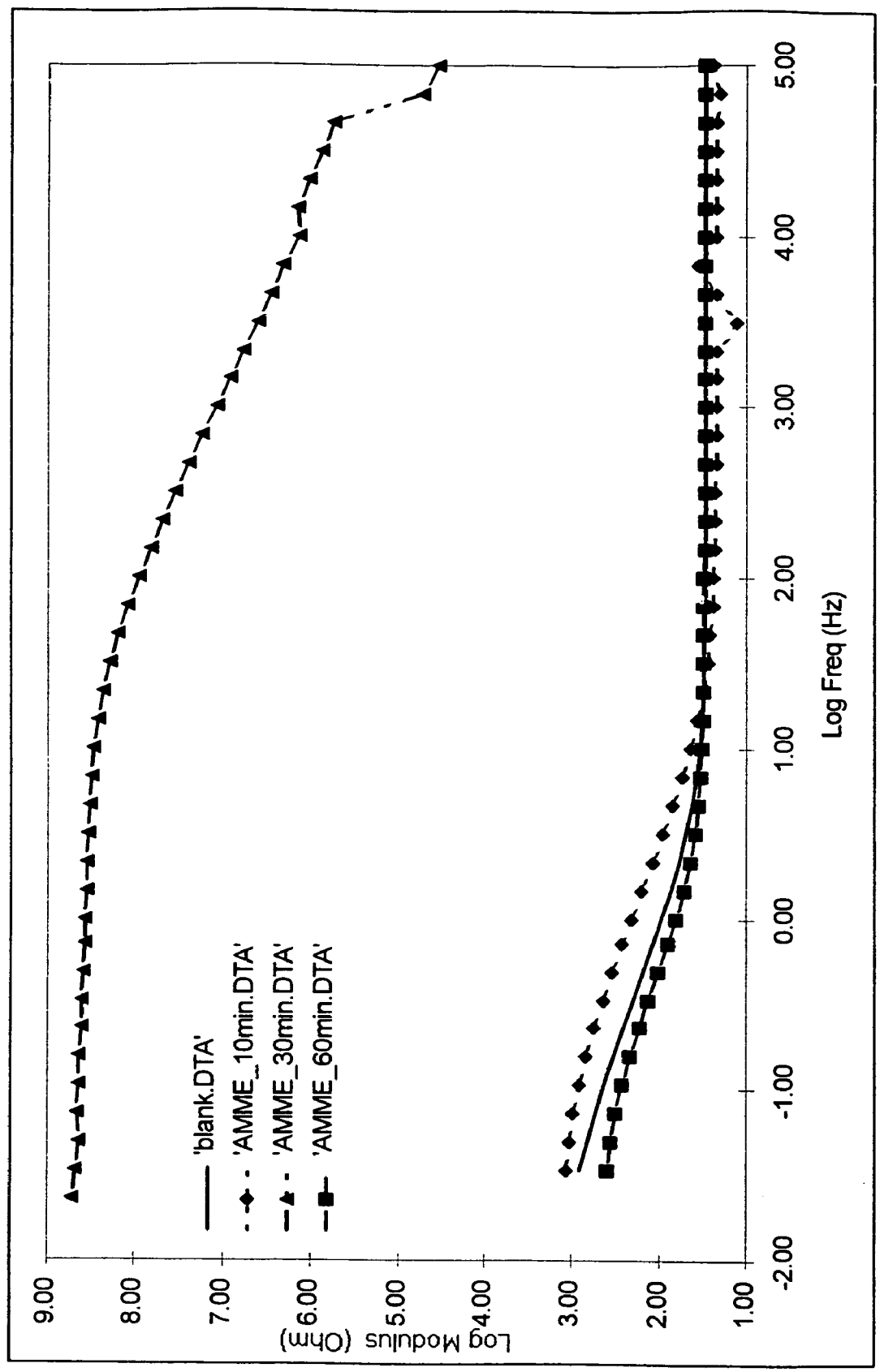
FIG. 23 is a graphical representation of electrochemical impedance spectroscopy (EIS) data obtained from the control formulation, experimental formulation of AMME cured for 10 minutes, experimental formulation of AMME cured for 30 minutes, and experimental formulation of AMME cured for 60 minutes in accordance with the present invention in Experiment 3.
Figure 24:
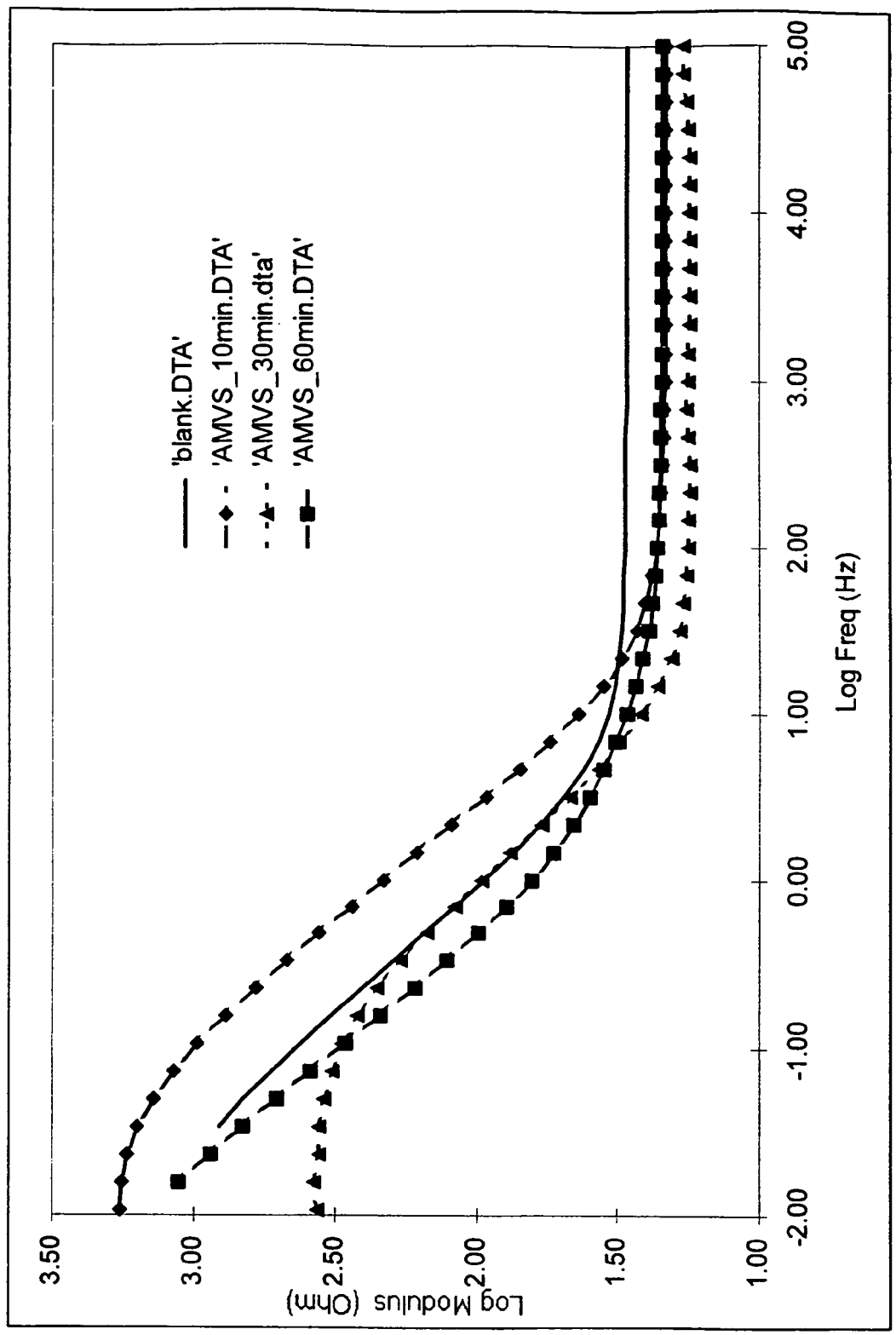
FIG. 24 is a graphical representation of electrochemical impedance spectroscopy (EIS) data obtained from the control formulation, experimental formulation of AMVS cured for 10 minutes, experimental formulation of AMVS cured for 30 minutes, and experimental formulation of AMVS cured for 60 minutes in accordance with the present invention in Experiment 3.
Figure 25:
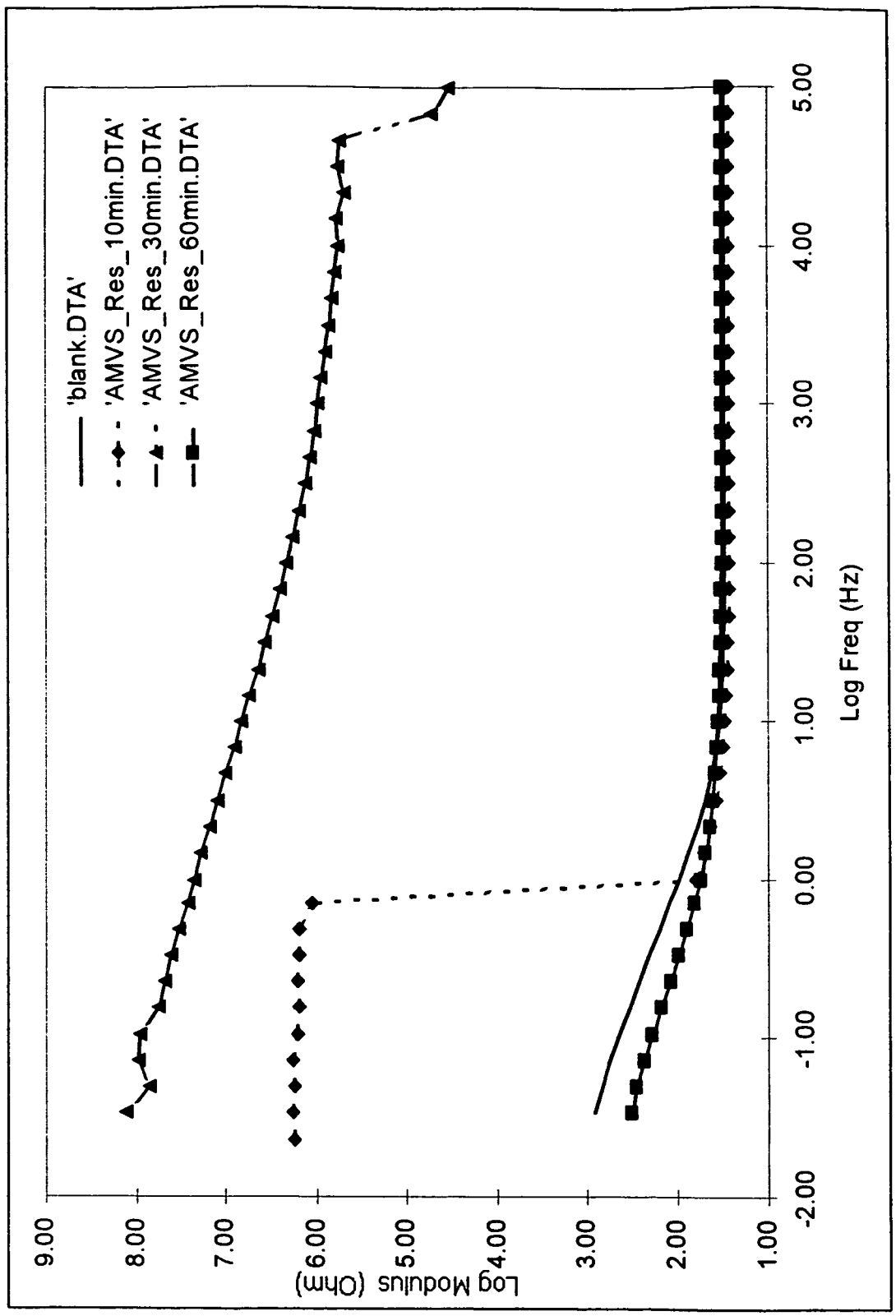
FIG. 25 is a graphical representation of electrochemical impedance spectroscopy (EIS) data obtained from the control formulation, experimental formulation of AMVS+Resin cured for 10 minutes, experimental formulation of AMVS+ Resin cured for 30 minutes, and experimental formulation of AMVS+Resin cured for 60 minutes in accordance with the present invention in Experiment 3.
Figure 26:
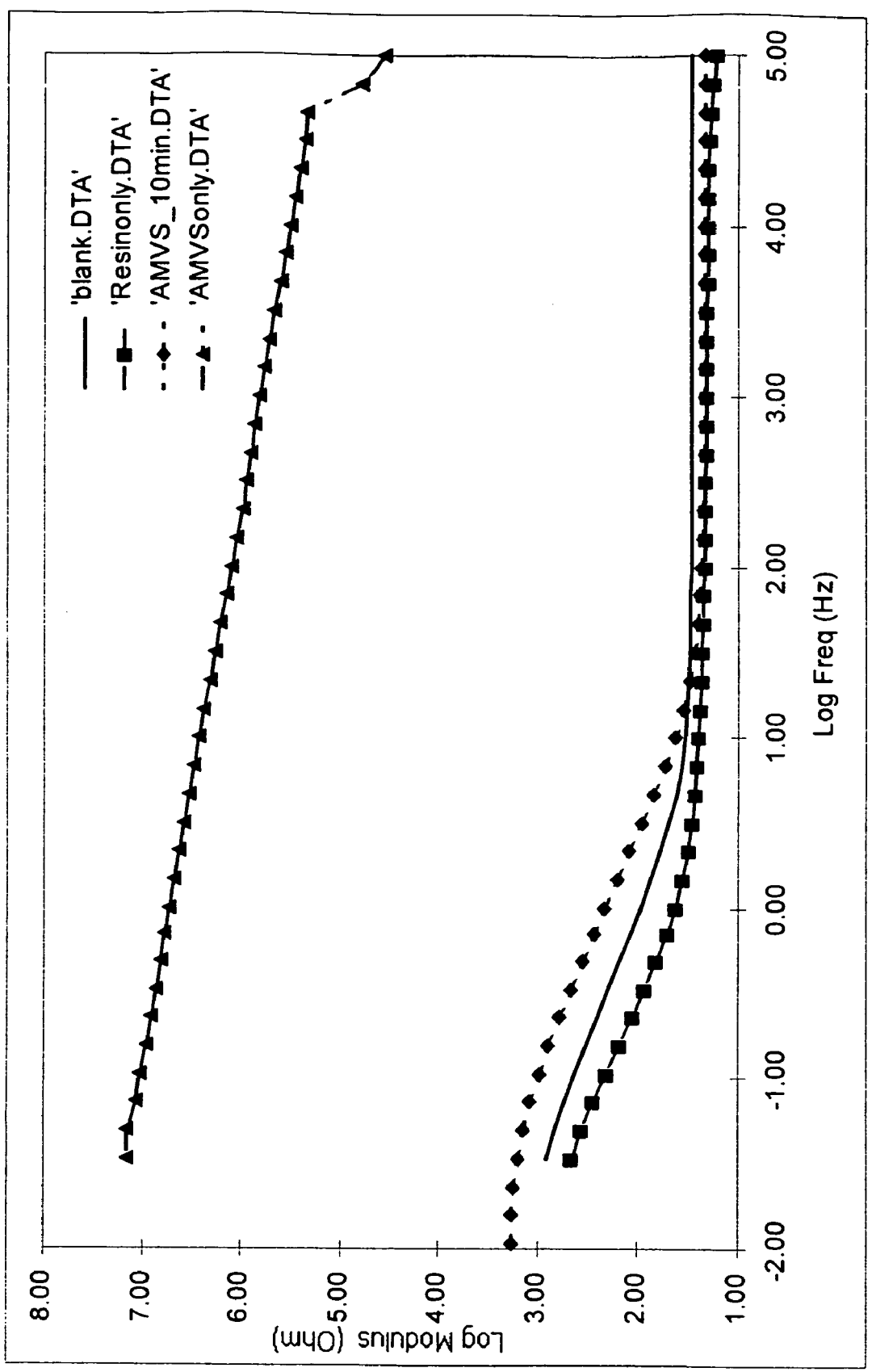
FIG. 26 is a graphical representation of electrochemical impedance spectroscopy (EIS) data obtained from the control formulation, experimental formulation with Resin cured for 60 minutes, experimental formulation of AMVS cured for 10 minutes, and experimental formulation of AMVS cured for 60 minutes in accordance with the present invention in Experiment 3.
Figure 27:
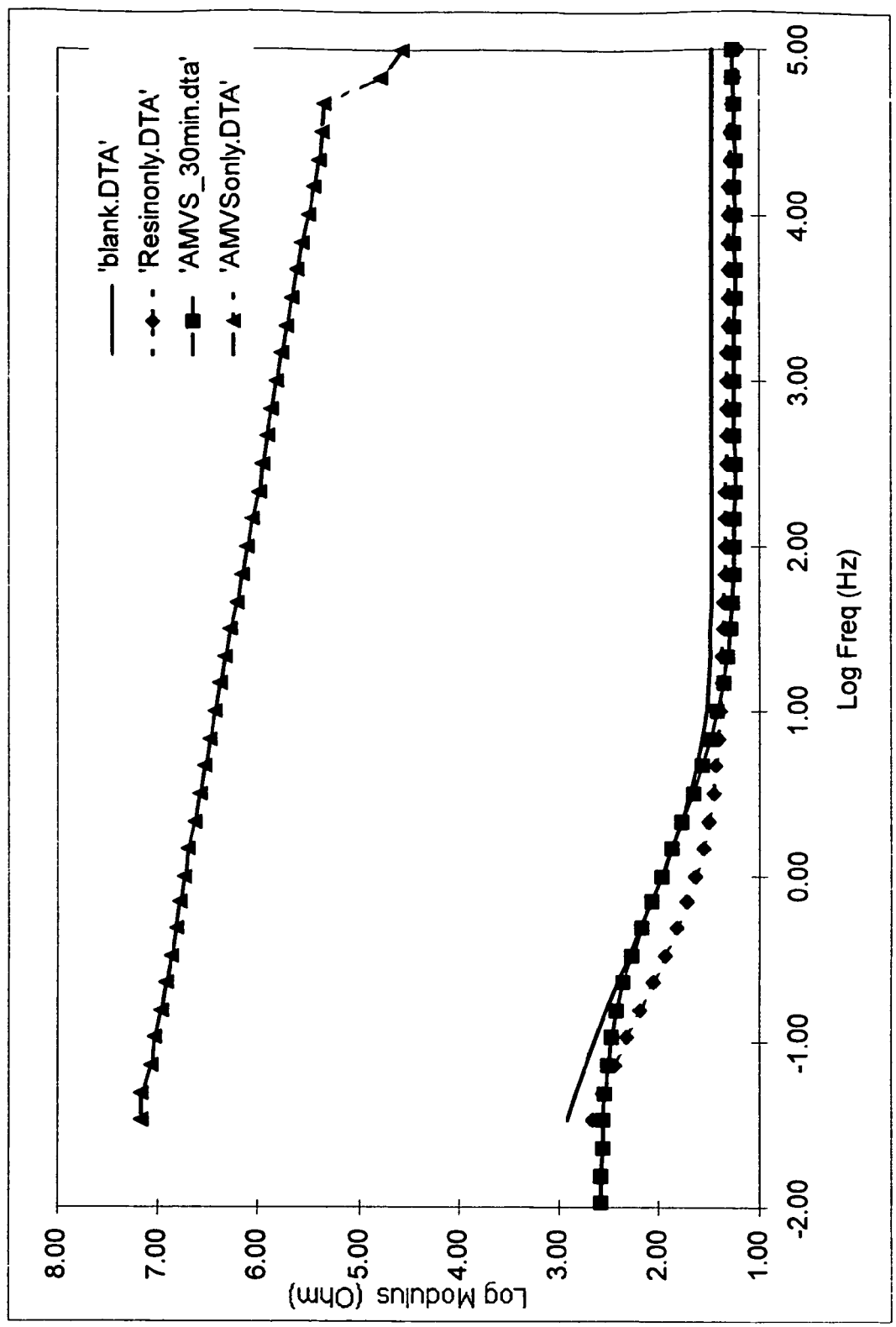
FIG. 27 is a graphical representation of electrochemical impedance spectroscopy (EIS) data obtained from the control formulation, experimental formulation with Resin cured for 60 minutes, experimental formulation of AMVS cured for 30 minutes, and experimental formulation of AMVS cured for 60 minutes in accordance with the present invention in Experiment 3.
Figure 28:
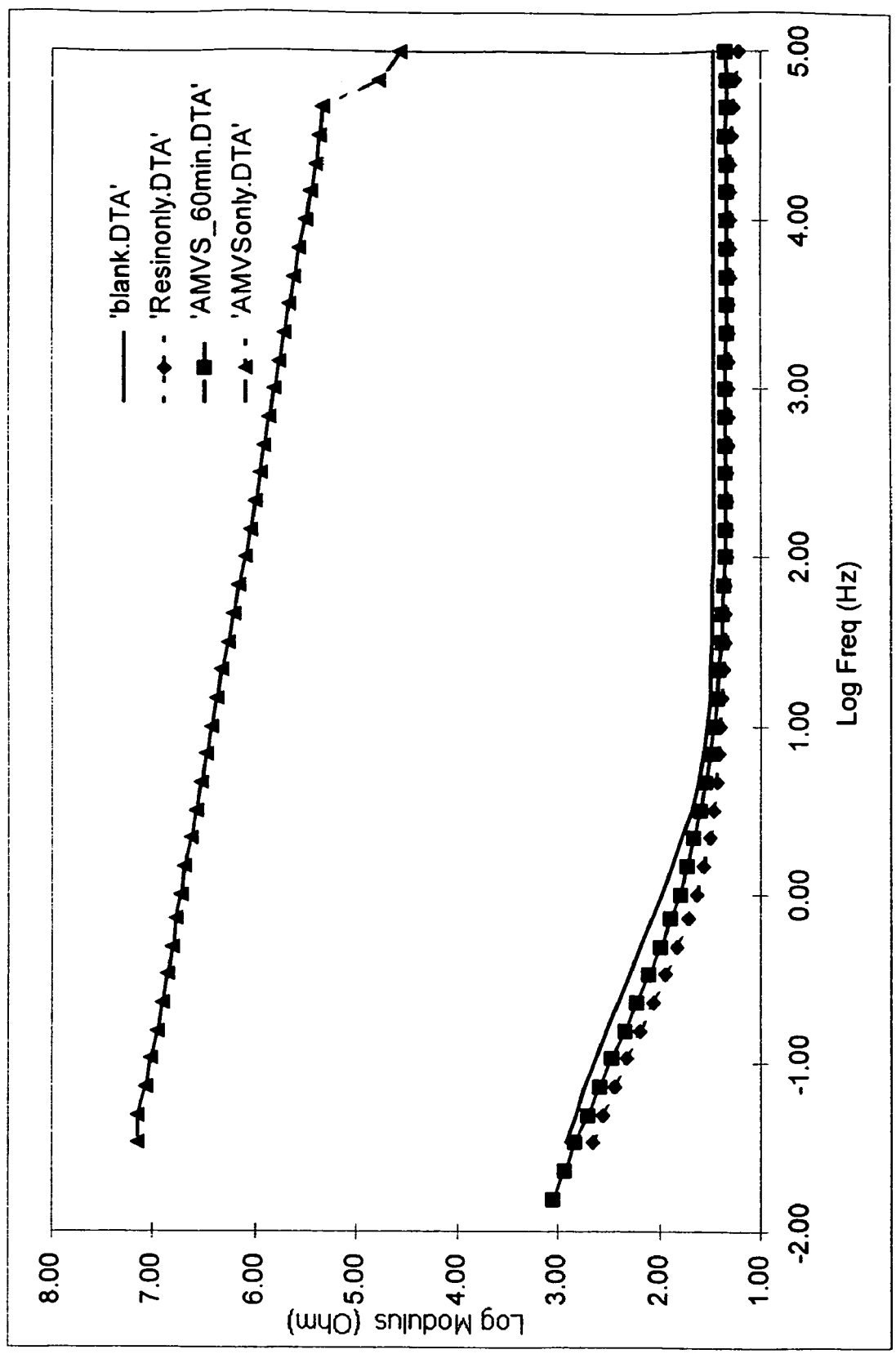
FIG. 28 is a graphical representation of electrochemical impedance spectroscopy (EIS) data obtained from the control formulation, experimental formulation with Resin cured for 60 minutes, experimental formulation of AMVS cured for 60 minutes, and experimental formulation of AMVS cured for 60 minutes in accordance with the present invention in Experiment 3.
Figure 29:
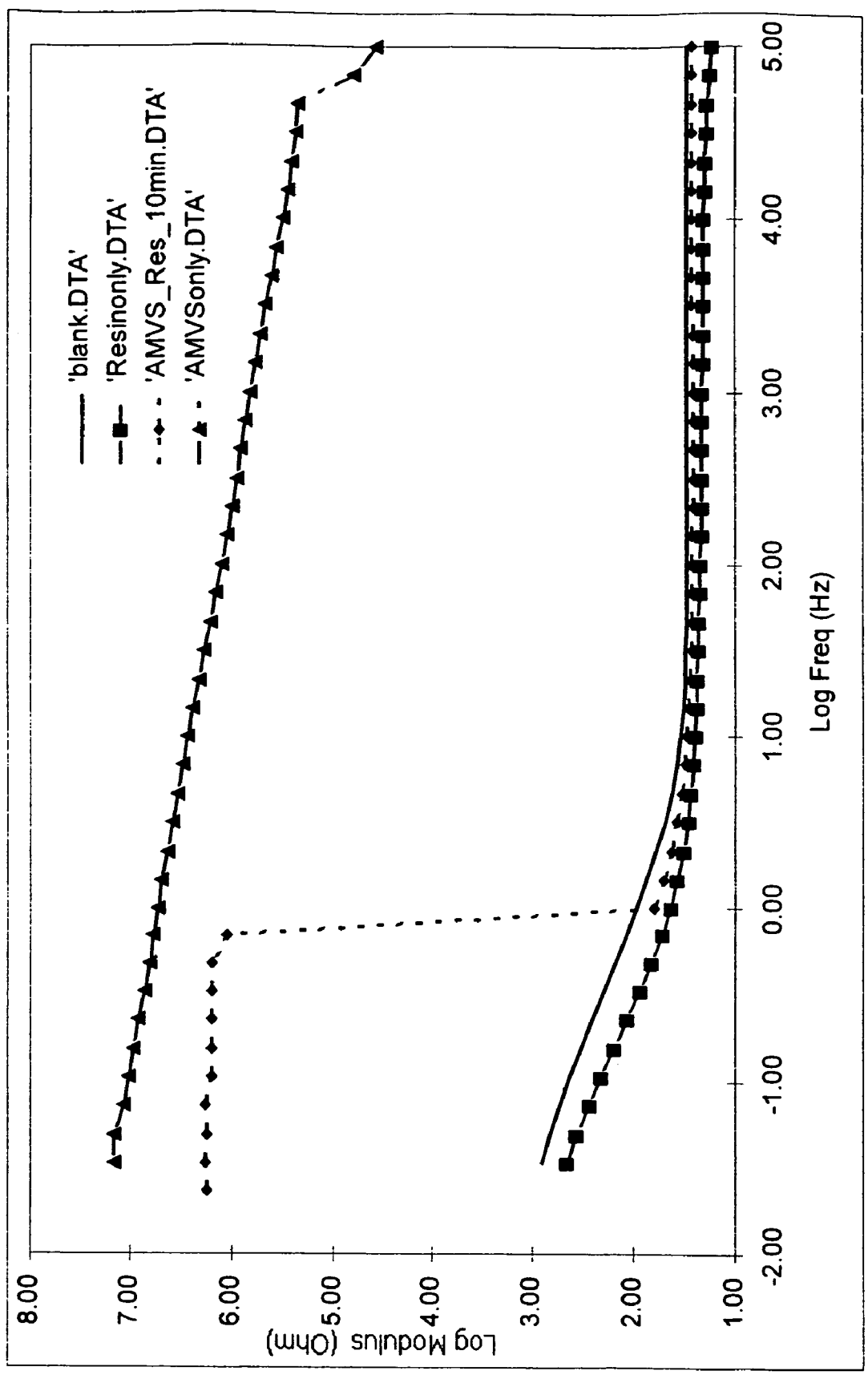
FIG. 29 is a graphical representation of electrochemical impedance spectroscopy (EIS) data obtained from the control formulation, experimental formulation with Resin cured for 60 minutes, experimental formulation of AMVS+Resin cured for 10 minutes, and experimental formulation of AMVS cured for 60 minutes in accordance with the present invention in Experiment 3.
Figure 30:
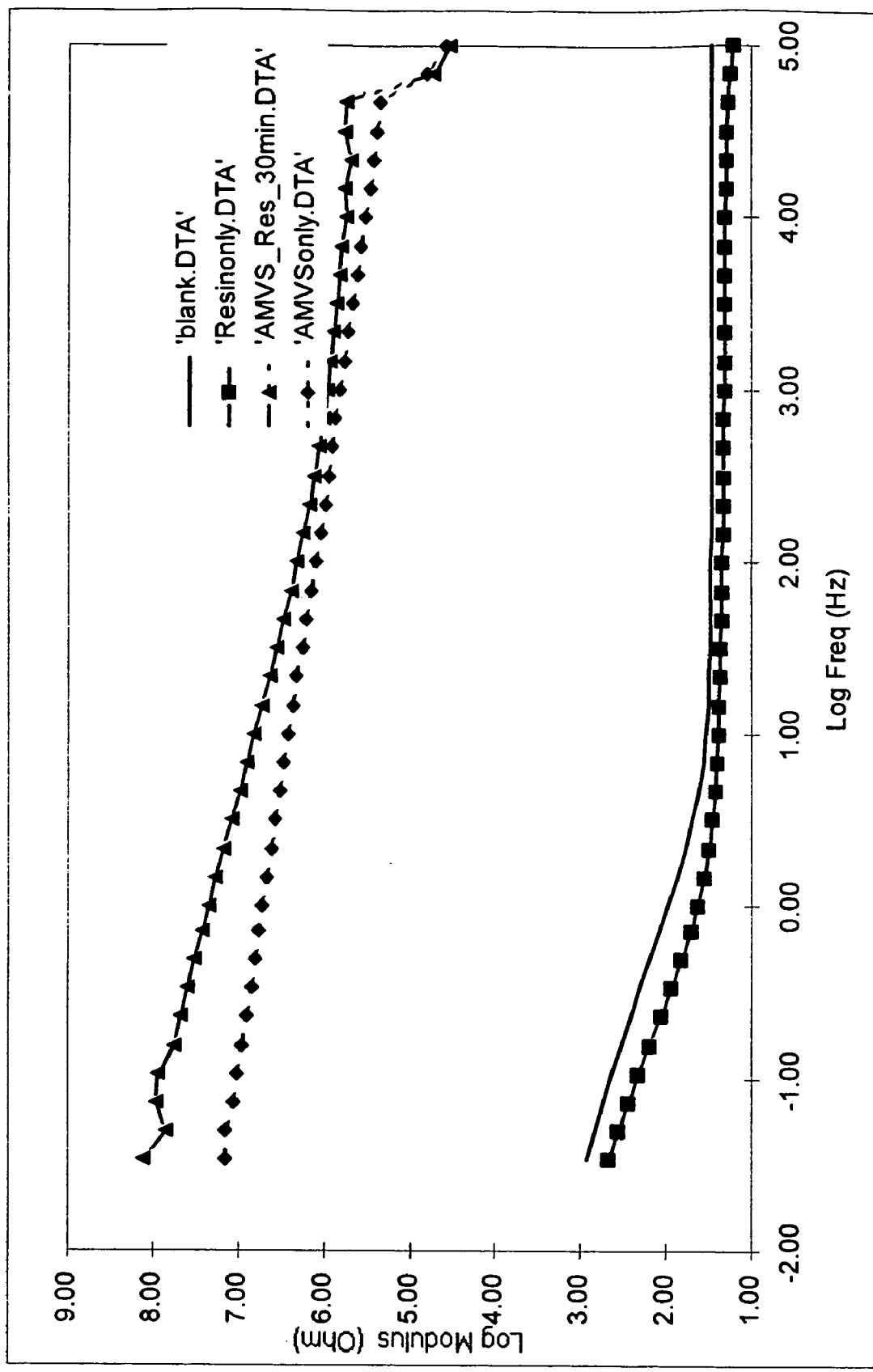
FIG. 30 is a graphical representation of electrochemical impedance spectroscopy (EIS) data obtained from the control formulation, experimental formulation with Resin cured for 60 minutes, experimental formulation of AMVS+Resin cured for 30 minutes, and experimental formulation of AMVS cured for 60 minutes in accordance with the present invention in Experiment 3.
Figure 31:
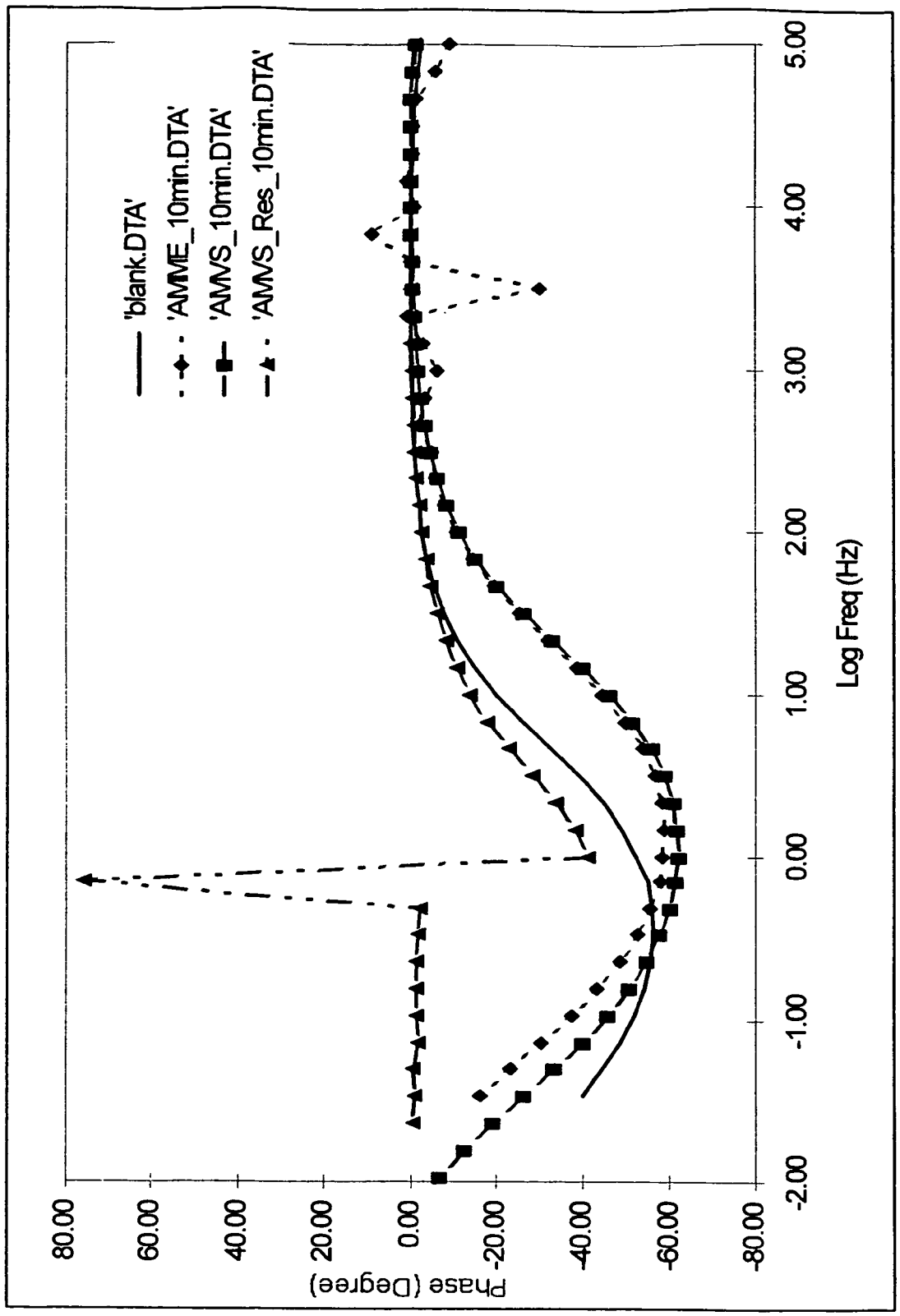
FIG. 31 is a graphical representation of electrochemical impedance spectroscopy (EIS) data a Bode plot obtained from the control formulation, experimental formulation of AMME cured for 10 minutes, experimental formulation of AMVS cured for 10 minutes, and experimental formulation of AMVS+Resin cured for 10 minutes in accordance with the present invention in Experiment 3.
Figure 32:
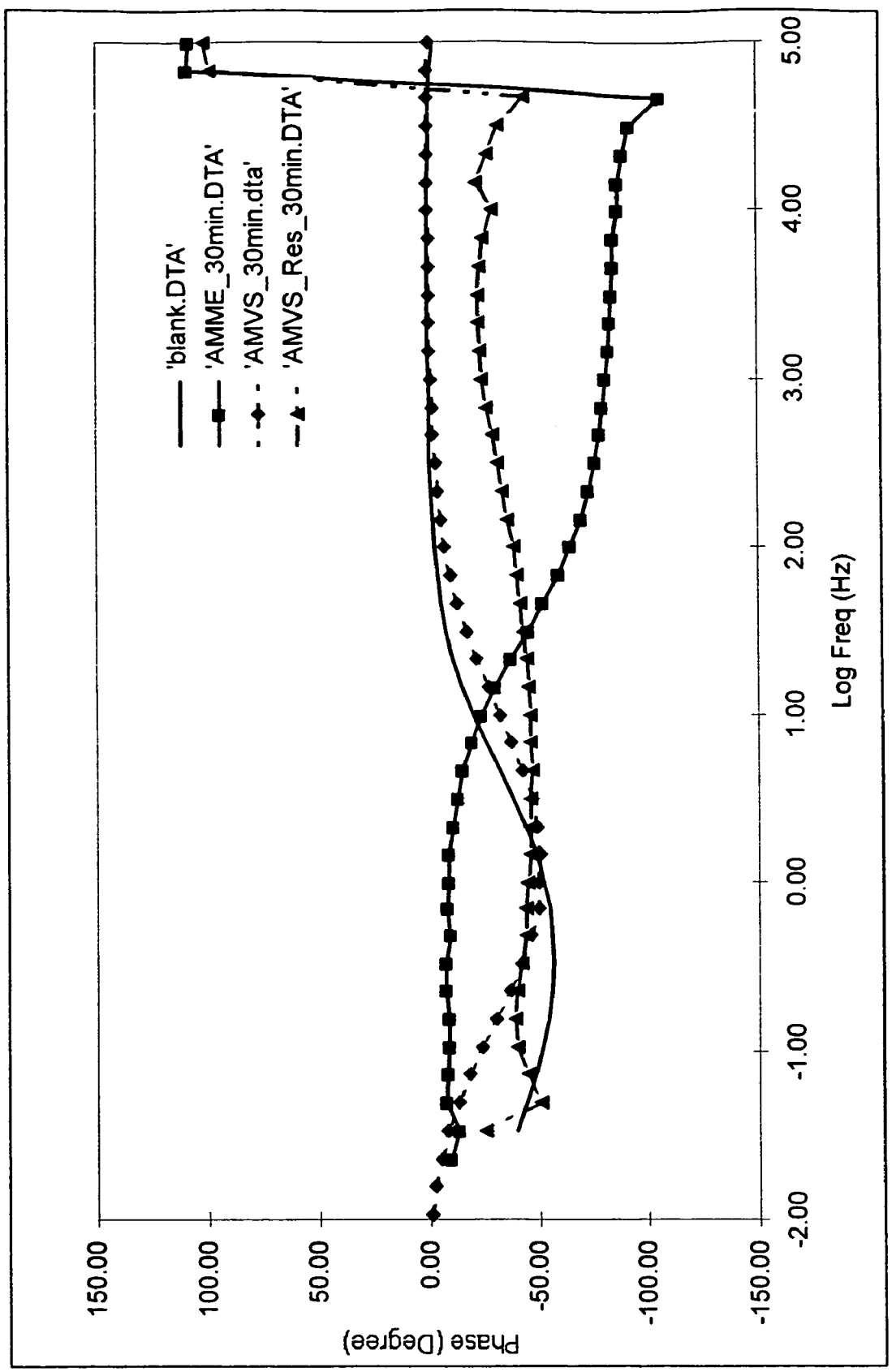
FIG. 32 is a graphical representation of electrochemical impedance spectroscopy (EIS) data a Bode plot obtained from the control formulation, experimental formulation of AMME cured for 30 minutes, experimental formulation of AMVS cured for 30 minutes, and experimental formulation of AMVS+Resin cured for 30 minutes in accordance with the present invention in Experiment 3.
Figure 33:
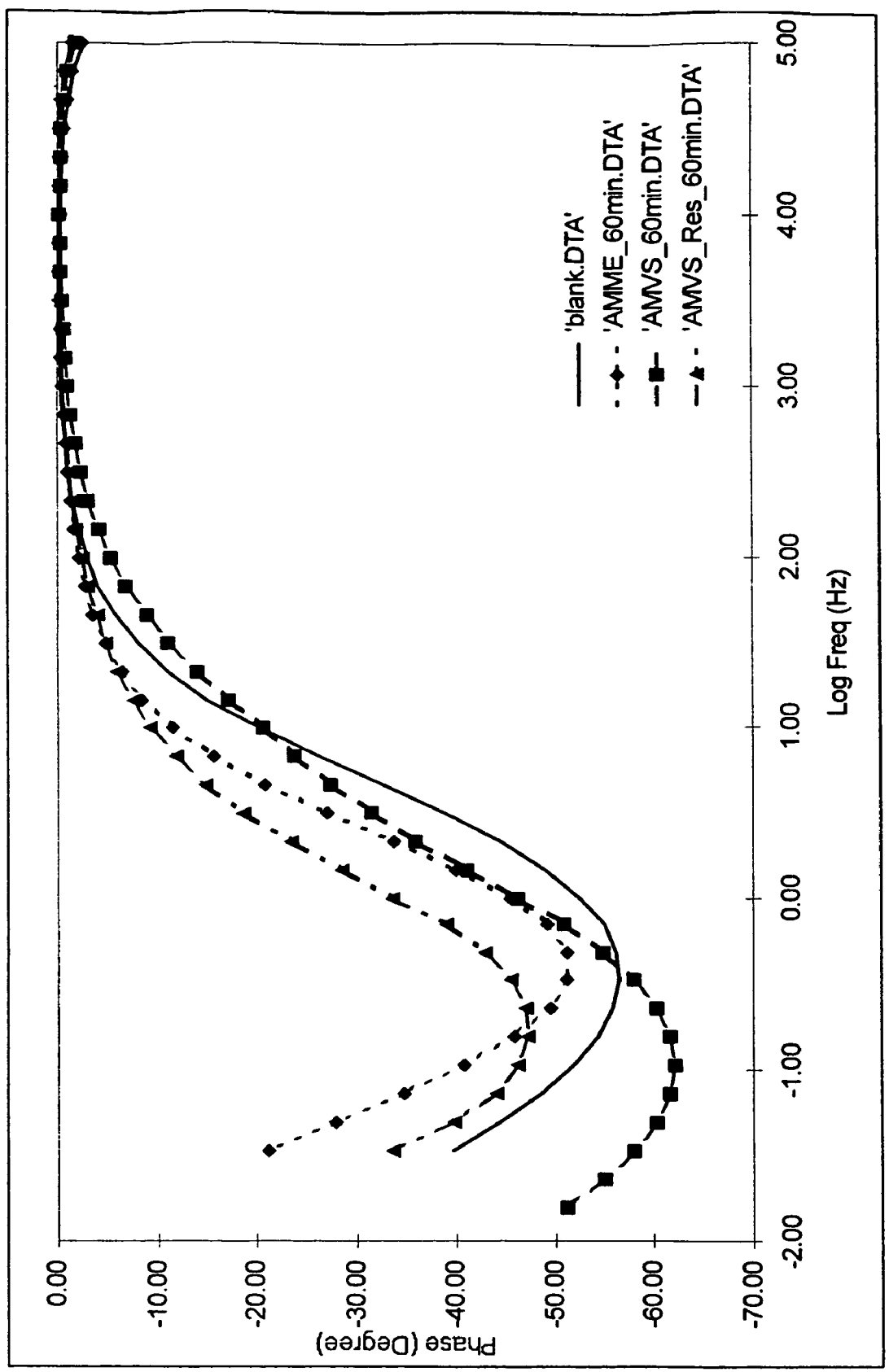
FIG. 33 is a graphical representation of electrochemical impedance spectroscopy (EIS) data a Bode plot obtained from the control formulation, experimental formulation of AMME cured for 60 minutes, experimental formulation of AMVS cured for 60 minutes, and experimental formulation of AMVS+Resin cured for 60 minutes in accordance with the present invention in Experiment 3.
Figure 34:
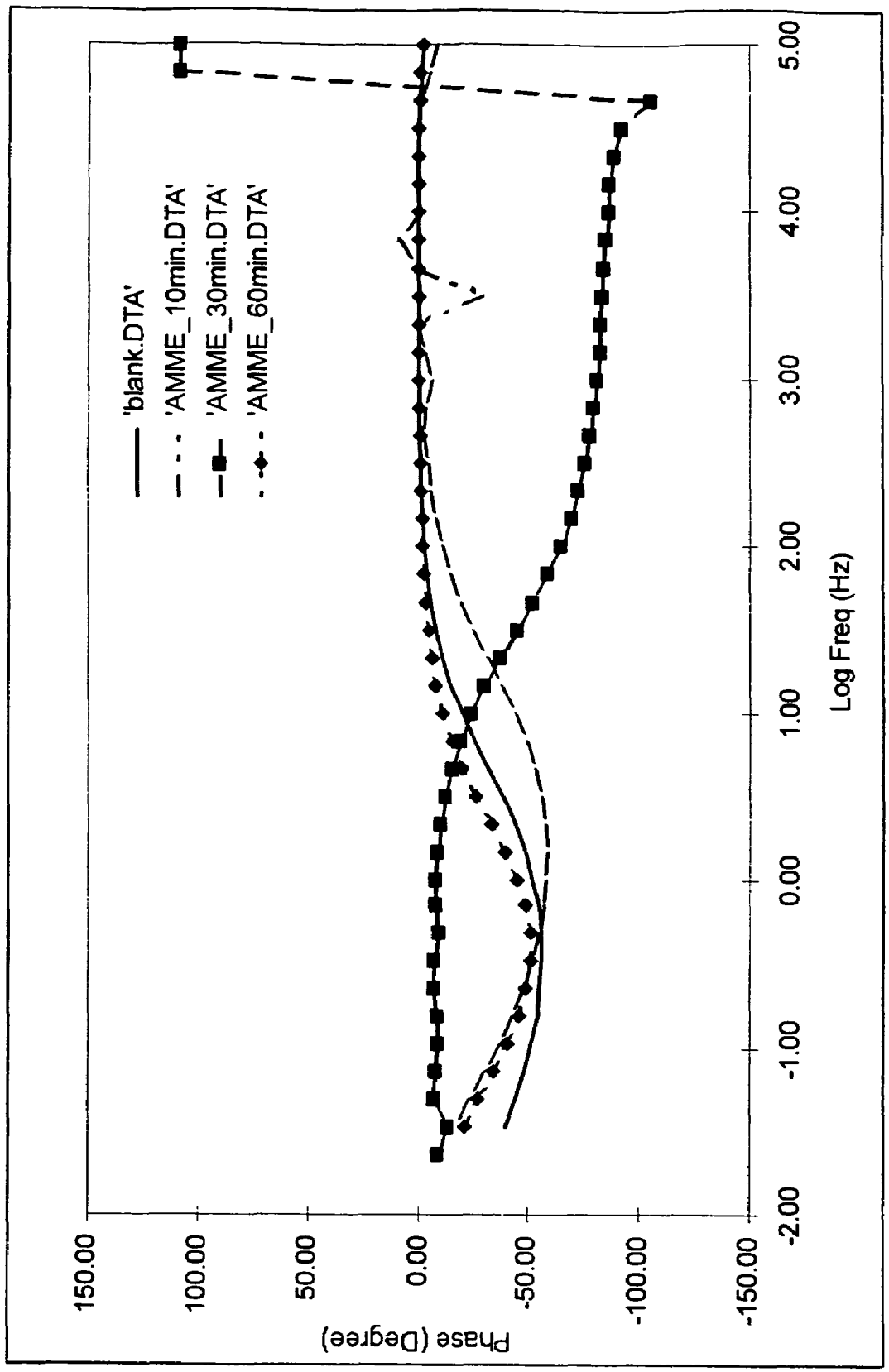
FIG. 34 is a graphical representation of electrochemical impedance spectroscopy (EIS) data a Bode plot obtained from the control formulation, experimental formulation of AMME cured for 10 minutes, experimental formulation of AMME cured for 30 minutes, and experimental formulation of AMME cured for 60 minutes in accordance with the present invention in Experiment 3.
Figure 35:
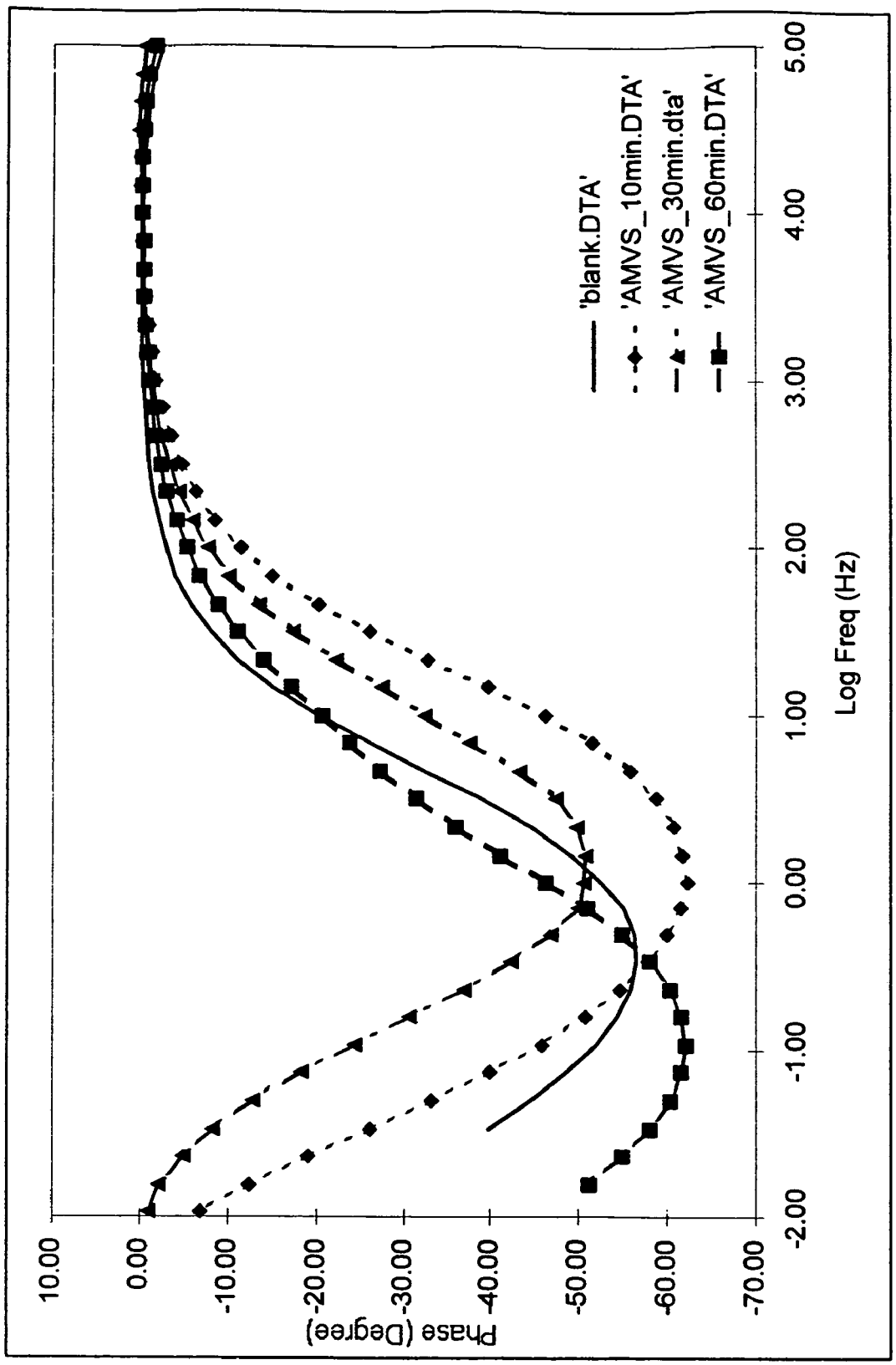
FIG. 35 is a graphical representation of electrochemical impedance spectroscopy (EIS) data a Bode plot obtained from the control formulation, experimental formulation of AMVS cured for 10 minutes, experimental formulation of AMVS cured for 30 minutes, and experimental formulation of AMVS cured for 60 minutes in accordance with the present invention in Experiment 3.
Figure 36:
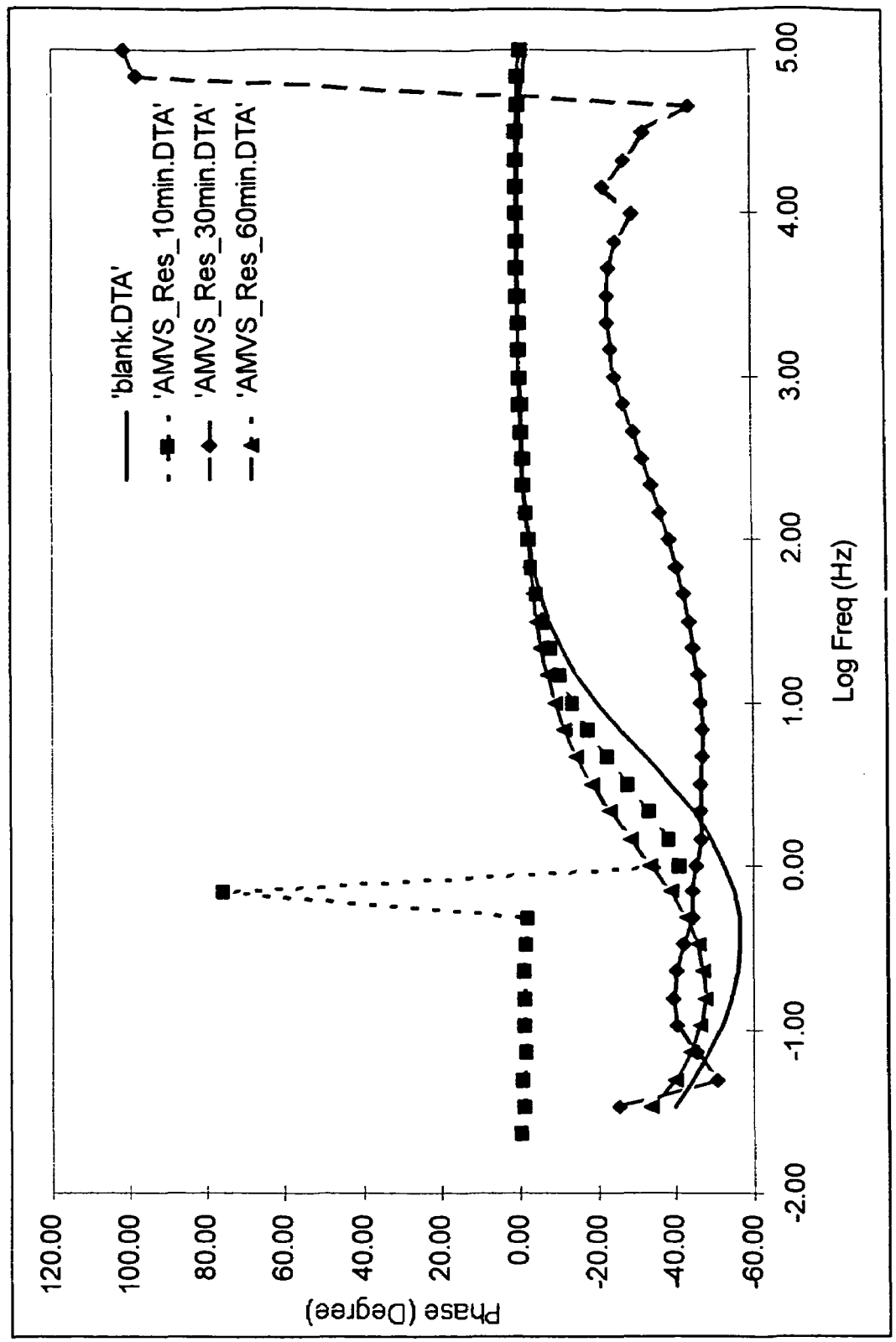
FIG. 36 is a graphical representation of electrochemical impedance spectroscopy (EIS) data a Bode plot obtained from the control formulation, experimental formulation of AMVS+Resin cured for 10 minutes, experimental formulation of AMVS+Resin cured for 30 minutes, and experimental formulation of AMVS+Resin cured for 60 minutes in accordance with the present invention in Experiment 3.
Figure 37:
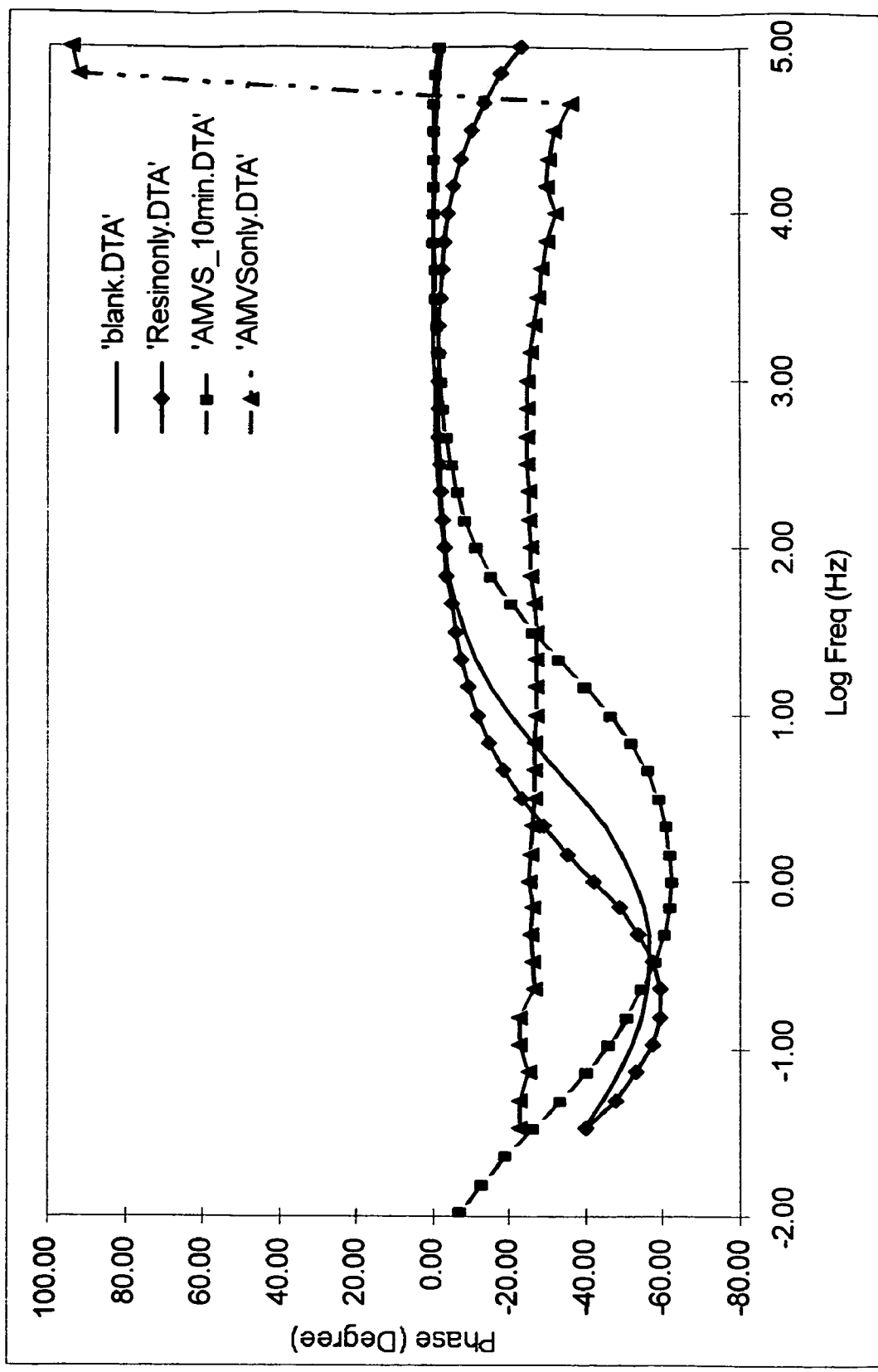
FIG. 37 is a graphical representation of electrochemical impedance spectroscopy (EIS) data a Bode plot obtained from the control formulation, experimental formulation with Resin cured for 60 minutes, experimental formulation of AMVS cured for 10 minutes, and experimental formulation of AMVS cured for 60 minutes in accordance with the present invention in Experiment 3.
Figure 38:
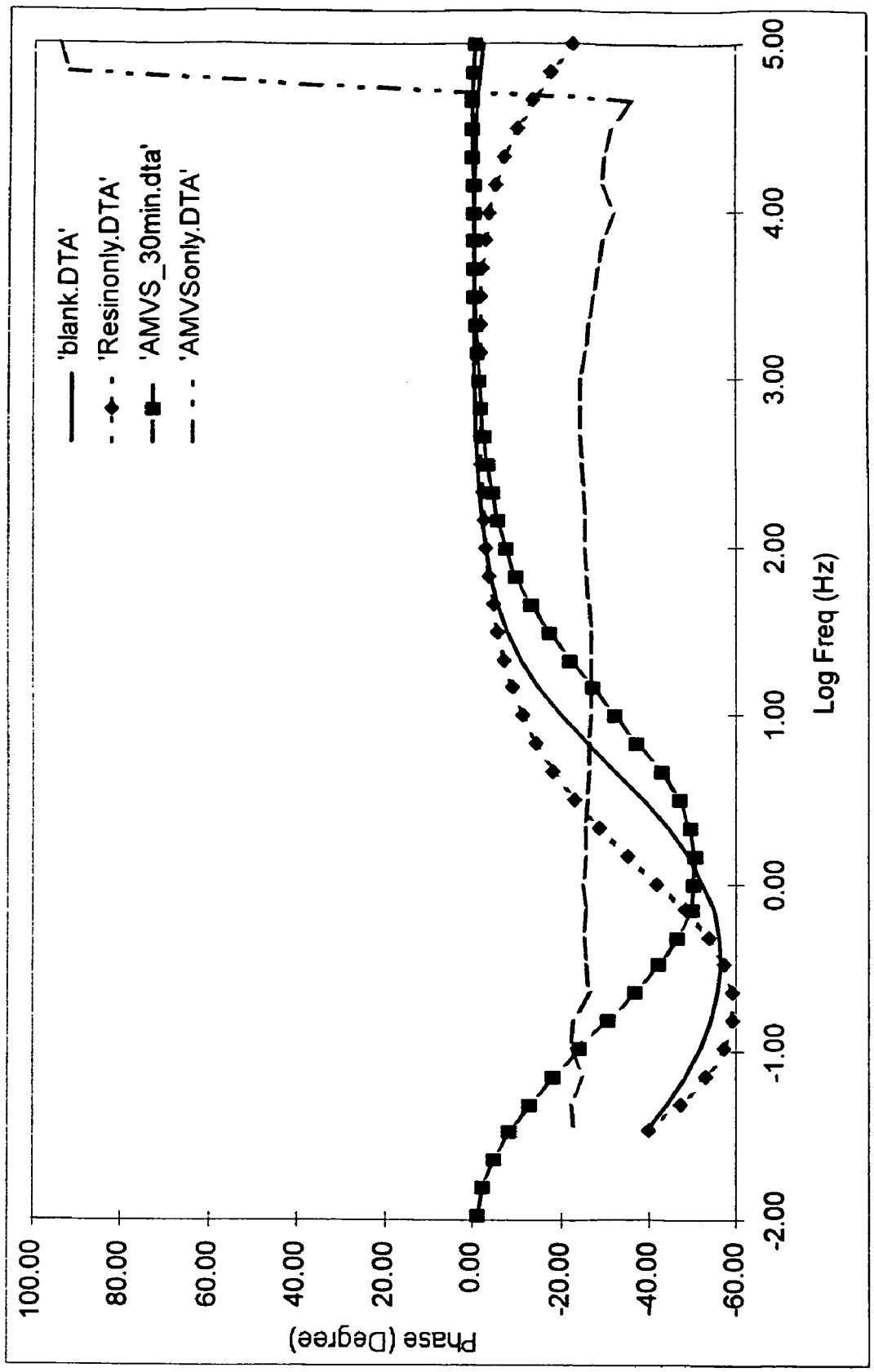
FIG. 38 is a graphical representation of electrochemical impedance spectroscopy (EIS) data a Bode plot obtained from the control formulation, experimental formulation with Resin cured for 60 minutes, experimental formulation of AMVS cured for 30 minutes, and experimental formulation of AMVS cured for 60 minutes in accordance with the present invention in Experiment 3.
Figure 39:
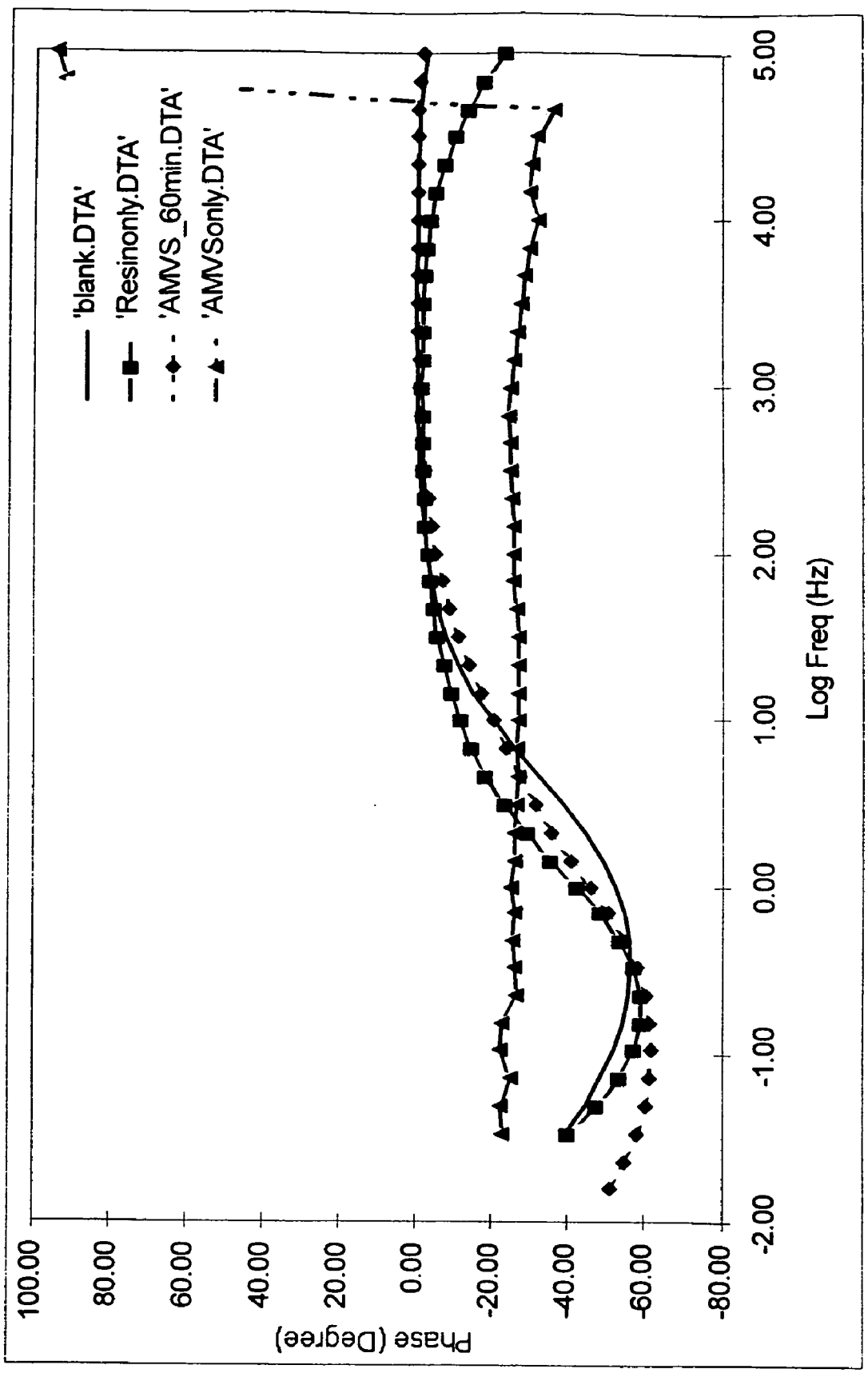
FIG. 39 is a graphical representation of electrochemical impedance spectroscopy (EIS) data a Bode plot obtained from the control formulation, experimental formulation with Resin cured for 60 minutes, experimental formulation of AMVS+Resin cured for 10 minutes, and experimental formulation of AMVS cured for 60 minutes in accordance with the present invention in Experiment 3.
Figure 40:
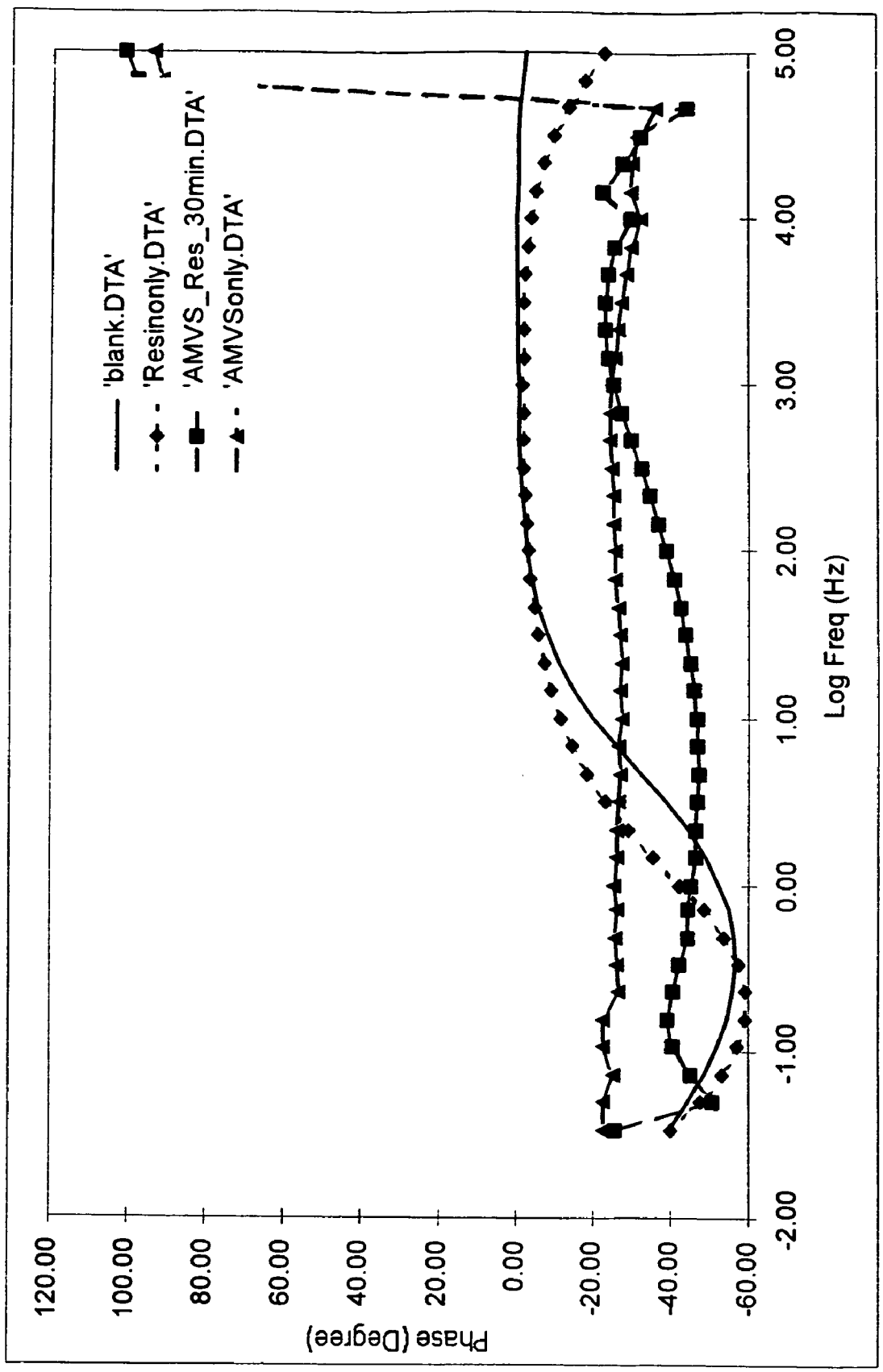
FIG. 40 is a graphical representation of electrochemical impedance spectroscopy (EIS) data a Bode plot obtained from the control formulation, experimental formulation with Resin cured for 60 minutes, experimental formulation of AMVS+Resin cured for 30 minutes, and experimental formulation of AMVS cured for 60 minutes in accordance with the present invention in Experiment 3.

Results: A ternary ratio program was used to evaluate various components of the coating. A (resin):(silane):(particle) system was adopted. The most promising coating compositions are listed in FIG. 7. Direct current polarization testing was done on some of these samples and the results are shown in FIG. 8. EIS testing was performed to better quantify individual coating performance. The best performing coating was then fully analyzed and evaluated against the pure non-hydrolyzed silane oil used in its formulation. FIG. 9 shows a comparison between the coating compositions termed, B6 and H6; both used Maincote PR-71 as the resin component. FIG. 10 displays the best performance with the observed failure of B6 within 7 days of immersion in NaCl. FIG. 11 shows the comparison of B6 to the pure silane mixture used in its formulation.

Discussion: It can be seen from the direct current polarization and EIS data that the new coating formulations behave well in comparison to the initial coatings produced with Rhoplex K-3. FIG. 8 shows that while the barrier properties of K-3's B5 were initially better, the corrosion current density quickly increased to nominal of the blank HDG sample when immersed in 3.5% (by weight) NaCl for 1 day. Both of Maincote PR-71's G4 and H6 displayed no change in the corrosion current density after 1 day of immersion. FIG. 8 also indicates that there is a measurable effect of coating composition and solids content, as both G4 and H6 use the same components, but at a different ratio. FIG. 9 continues to highlight the effect of composition as both H6 and B6 are similar except for the silane mixture and the overall ratio used. One can begin to see a tentative positive trend of the coating performance as more silane is added. FIG. 10 shows the eventual failure of B6 after 5 days as it begins to absorb significant amounts of water, reflected in the downward shift of the impedance slope to a more capacitance value. Finally, FIG. 11 shows the superior properties B6 has over the pure silane itself.

Experiment 2

All coating solutions are made by direct addition of the various components almost simultaneously and immediate high shear mixing for approximately 5 to 30 seconds. Extended mixing is known to heat the solution, which can induce premature polymerization. The total volume of the coating solutions produced is 100 ml.

Components: (1) Silane solution—Table 1 below lists the components utilized in the present data set. The components included: AMME comprising 65-75% aminopropylsilsesquioxane and 25-35% methylsilsequioxane; AMVS comprising 60-65% aminopropylsileequioxane and 35-40% vinylsilsesequioxane; deionized water. The A 19201 Chemat Silane includes nanoparticles and the PU 402 A is a polyurethane resin.

TABLE 1

| Coating Number | PU 402 A | AMME Silane | A 19201 (Chemat Silane) | AMVS Silane | Water |
|---|---|---|---|---|---|
| Control | 100 mL | — | — | — | — |
| 1 | 60 mL | 10 mL | 30 mL | — | — |
| 2 | 70 mL | 30 mL | — | — | — |
| 3 | 67.5 mL | 32.5 mL | — | — | — |
| 4 | 50 mL | — | 50 mL | — | — |
| 5 | 70 mL | — | 30 mL | — | — |
| 6 | 60 mL | 10 mL | 10 mL | — | — |
| 7 | 50 mL | 20 mL | — | — | 30 mL |
| 8 | 44.44 mL | — | — | 33.33 mL | 22.23 mL |

Substrates: Cold rolled steel panels were ultrasonically cleaned in acetone for 5 minutes. Thereafter the surface of each panel was wiped to remove any residue. The acetone cleaned panels were then subjected to an alkaline cleaner (7% KOH) at 60° C. and thereafter rinsed with deionized water and immediately dried.

Application and Cure: Coatings were applied by "drawn-down bar" technique consistent with normal paint/coating procedures. A #14 bar was used to apply the coatings. The coated panels were placed in a horizontal orientation and cured for 2 hours at 120° C. to a tack-free state.

Testing: The panels were exposed for 24 hours to a 3.5% (by weight) NaCl solution. A strip was cut from the panels after the exposure and bent into a U-shape with the silane on the convex side. Electrochemical impedance spectroscopy (EIS) testing was done on all panels.

Results: Table 2 summarizes the qualitative results observed after the 24 hours of immersion in NaCl and after the panels were bent in a U-shaped manner. Likewise, FIGS. 12-19 detail the quantitative data produced prior to the U-shaped bend as a result of the EIS testing, with FIGS. 16-19 showing EIS Bode plots. Each Figure provides the "Control data" attributable to the panel coated only with the PU 402 A solution.

TABLE 2

| Coating # | Ranking as per extent of Rusting observed (1 means MOST Rusted, 9 means LEAST Rusted) | Peeling observed if any with comments |
|---|---|---|
| Control | 6 | No peeling observed though very tiny blisters seen. |
| 1 | 9 | Coating seen to peel at the edge on the top but no significant rusting observed in the sample |
| 2 | 4 | No peeling on bent surface but away from it on edges of coating |
| 3 | 3 | Peeling occurs on the area of bend and other areas too |
| 4 | 7 | A very little amount of peeling at the area of bend observed otherwise film fairly intact |
| 5 | 8 | No peeling on bent surface but away from it on edges of coating |
| 6 | 5 | Blistering in increasing magnitude observed as we move away from the area of bend. No significant rusting seen |
| 7 | 1 | 4 spots of Peeling observed at the area of bend |
| 8 | 2 | Peeling observed over the bent area |

Discussion: It can be seen from the EIS data that these coating formulations behave well in comparison to the control having only the PU 402 A coating. Thus, the differentiation appears to be the ability of the coating to conform to additional shapes and/or providing corrosion resistance that is mobile. In this area of concern, the formulations #8 and #9 showed the most promise. One obvious trend is the addition of water to dilute the solution provided positive results, potentially showing that a thinner film coat is better adaptable to changes in orientation of the substrate.

Experiment 3

All coating solutions are made by direct addition of the various components almost simultaneously and immediate high shear mixing for approximately 5 to 30 seconds. Extended mixing is known to heat the solution, which can induce premature polymerization. The total volume of the coating solutions produced is 100 ml.

Components: (1) Silane solution—Table 1 below lists the components utilized in the present data set. The components included: AMME comprising 65-75% aminopropylsilsesquioxane and 25-35% methylsilsequioxane; AMVS comprising 60-65% aminopropylsileequioxane and 35-40% vinylsilsesequioxane; and PU 402 A which is a polyurethane resin.

TABLE 3

| Coating Number | PU 402 A | AMME Silane | AMVS Silane |
|---|---|---|---|
| 1 | 62.5 mL | 37.5 mL | — |
| 2 | 62.5 mL | — | 37.5 mL |

Substrates: Cold rolled steel panels were ultrasonically cleaned in acetone for 5 minutes. Thereafter the surface of each panel was wiped to remove any residue. The acetone cleaned panels were then subjected to an alkaline cleaner (7% KOH) at 60° C. and thereafter rinsed with deionized water and immediately dried.

Application and Cure: Coatings were applied by "drawndown bar" technique consistent with normal paint/coating procedures. A #14 bar was used to apply the coatings. Panels were coated with the solutions as shown in Table 3, along with some panels having a first coat of AMVS silane and a top coat of PU 402 A. The coated panels were placed in a horizontal orientation and cured at 120° C. at the various times shown in Table 4. Thereafter the panels were removed and allowed to cool for 24 hours at room temperature to arrive at a tack-free state.

TABLE 4

| Coating # | Constituents | Baking Time |
|---|---|---|
| 1 | PU 402A & AMME in a 5:3 ratio applied to panel | 10 minutes |
| 2 | PU 402A & AMVS in a 5:3 ratio applied to panel | 10 minutes |
| 3 | PU 402A & AMME in a 5:3 ratio applied to panel | 30 minutes |
| 4 | PU 402A & AMVS in a 5:3 ratio applied to panel | 30 minutes |
| 5 | PU 402A & AMME in a 5:3 ratio applied to panel | 60 minutes |
| 6 | PU 402A & AMVS in a 5:3 ratio applied to panel | 60 minutes |
| 7 | AMVS coat on panel, followed by a coat of PU 402A over the AMVS layer | 10 minutes |

TABLE 4-continued

| Coating # | Constituents | Baking Time |
|---|---|---|
| 8 | AMVS coat on panel, followed by a coat of PU 402A over the AMVS layer | 30 minutes |
| 9 | AMVS coat on panel, followed by a coat of PU 402A over the AMVS layer | 60 minutes |

Testing: Each panel, after having been allowed to cure for the requisite times listed in Table 4 and cool, was exposed for 24 hours to a 3.5% (by weight) NaCl solution. Electrochemical impedance spectroscopy (EIS) testing was done on all panels subsequent to the 24 hour exposure.

Results & Discussion: FIGS. 20-30 detail the quantitative data produced as a result of the EIS testing. Each Figure provides the "blankDTA" attributable to the panel coated with only the PU 402 A solution.

Following from the above description and invention summaries, it should be apparent to those of ordinary skill in the art that, while the methods and apparatuses herein described constitute exemplary embodiments of the present invention, it is to be understood that the inventions contained herein are not limited to these precise embodiments and that changes may be made to them without departing from the scope of the inventions as defined by the claims. Additionally, it is to be understood that the invention is defined by the claims and it not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of laminating a substrate with a corrosion barrier comprising the steps of:
   mixing a bis-silane, a water soluble or dispersible polymer, nanoparticles having mean particle size of between about 0.01 nanometers and about 500 nanometers, and a water soluble solvent to comprise a resultant composition;
   applying the resultant composition to a substrate; and
   curing the resultant composition on the substrate to create a corrosive barrier having a thickness greater than 20 microns.

2. The method of claim 1, wherein the mixing step includes the step of including at least one of an emulsifier, a surfactant, a film builder, a leachable inhibitor, a thickener, a toughening agent, an ultraviolet absorber, and an ultraviolet reflector to the composition.

3. The method of claim 2, wherein the leachable inhibitor includes at least one of a salt of trivalent cerium (Ce), a salt of trivalent lanthanum (Le), a salt of yttrium (Y), a molybdate, a phosphate, a phosphonate, a phosphomolybdate, a vanadate, a borate, an amine, a glycolate, a sulfenamide, and a tungstate.

4. The method of claim 1, wherein:
   the bis-silane comprises between about 10 weight percent to about 40 weight percent of the composition;
   the nanoparticles comprise between about 5 weight percent to about 25 weight percent of the composition;

the water soluble or dispersible polymer comprises between 10 weight percent to about 30 weight percent of the composition; and the water soluble solvent comprises between about 10 weight percent to about 87 weight percent of the composition.

5. The method of claim 1, wherein the bis-silane includes a silane other than the bis-silane.

6. The method of claim 1, wherein the water soluble or dispersible polymer includes an epoxy resin.

7. The method of claim 6, wherein the water soluble or dispersible polymer includes an acrylate resin.

8. The method of claim 7, wherein the ratio of acrylate resin to epoxy resin is between about 8:2 to about 6:4.

9. The method of claim 1, wherein the water soluble or dispersible polymer and the nanoparticles comprise more than 50 weight percent of the resulting composition.

10. The method of claim 1, wherein the act of curing the resultant composition on the substrate includes baking the substrate and resulting composition.

11. The method of claim 10, wherein the act of baking the substrate and resulting composition includes baking the substrate and resulting composition in an environment above 100° C. for a duration of more than 5 minutes.

12. The method of claim 1, wherein the bis-silane provides a siloxane network to bind the water soluble or dispersible polymer and the nanoparticles upon curing of the composition.

* * * * *